(12) United States Patent
Nakamura et al.

(10) Patent No.: US 12,732,079 B2
(45) Date of Patent: Sep. 8, 2026

(54) LINEAR ROTARY MOTOR

(71) Applicant: Mitsubishi Electric Corporation, Tokyo (JP)

(72) Inventors: Yuichiro Nakamura, Tokyo (JP); Hiroyuki Sekiguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 221 days.

(21) Appl. No.: 18/709,519

(22) PCT Filed: Nov. 26, 2021

(86) PCT No.: PCT/JP2021/043399
§ 371 (c)(1),
(2) Date: May 13, 2024

(87) PCT Pub. No.: WO2023/095285
PCT Pub. Date: Jun. 1, 2023

(65) Prior Publication Data
US 2025/0007377 A1 Jan. 2, 2025

(51) Int. Cl.
*H02K 33/12* (2006.01)
*H02K 11/21* (2016.01)
*H02K 33/18* (2006.01)

(52) U.S. Cl.
CPC ............. *H02K 33/12* (2013.01); *H02K 11/21* (2016.01); *H02K 33/18* (2013.01)

(58) Field of Classification Search
CPC ........ H02K 21/14; H02K 41/03; H02K 16/00; H02K 33/12; H02K 11/21; H02K 33/01; H02K 7/06
See application file for complete search history.

(56) References Cited

U.S. PATENT DOCUMENTS 7,218,017 B1 * 5/2007 Chitayat ................ H02K 21/14
417/415
2007/0176497 A1 8/2007 Chitayat et al.
(Continued)

FOREIGN PATENT DOCUMENTS

JP 2009-112087 A 5/2009
JP 2010-060478 A 3/2010
(Continued)

OTHER PUBLICATIONS

International Search Report and Written Opinion mailed on Jan. 11, 2022, received for International Application No. PCT/JP2021/043399, filed on Nov. 26, 2021, 10 pages including English Translation.

(Continued)

*Primary Examiner* — Leda T Pham
(74) *Attorney, Agent, or Firm* — XSENSUS LLP

(57) ABSTRACT

A linear rotary motor includes: a frame; a stator including a linear motion coil and a rotation coil; and a mover including a shaft and a magnet, the shaft including an output shaft. The linear motion coil and the rotation coil is energized to cause the mover to move rectilinearly and rotate. A linear motion detector is disposed on the frame or the stator in such a way as to face the magnet, and detects a position of the mover in a linear motion direction. A linear motion scale is provided on an outer periphery of the mover, the linear motion scale being provided over a range of motion in the linear motion direction and a range of rotation in a circumferential direction so as to face the linear motion detector when the mover moves rectilinearly or rotates.

9 Claims, 17 Drawing Sheets

(56) References Cited

U.S. PATENT DOCUMENTS

| | | | | |
|---|---|---|---|---|
| 2011/0175462 | A1* | 7/2011 | Boletis | H02K 41/03 310/12.19 |
| 2012/0001499 | A1* | 1/2012 | Makino | H02K 41/03 310/12.14 |

FOREIGN PATENT DOCUMENTS

| | | | |
|---|---|---|---|
| JP | 2011-147333 | A | 7/2011 |
| JP | 2012-016180 | A | 1/2012 |
| JP | 2012-085527 | A | 4/2012 |

OTHER PUBLICATIONS

Notice of Reason for Refusal mailed on Dec. 6, 2022, received for JP Application 2022-564832, 8 pages including English Translation.

* cited by examiner 5d
62
60
61
40
5c
31
30
32
5a
5
51
50
52
IV
IV
15
16
III
III
22
20
13
21
10
12
11
37
35
5b
36
21a 5d
62
60
61
40
5c
5a
15
52
50
51
13
10
12
11
5b
21a
31
30
32
5
16
22
20
21
37
35
36

LINEAR ROTARY MOTOR

CROSS-REFERENCE TO RELATED APPLICATION

This application is a national stage application, pursuant to 35 U.S.C. § 371, of International Patent Application No. PCT/JP2021/043399, filed Nov. 26, 2021, the entire contents of which are incorporated herein by reference.

FIELD

The present disclosure relates to a linear rotary motor in which a mover moves rectilinearly and rotates.

BACKGROUND

A linear rotary motor has been disclosed which performs linear motion and rotation with a single actuator. This type of linear rotary motor includes a mover and a stator. The mover includes a permanent magnet serving as a field magnet. The stator includes an armature winding that generates a rotating magnetic field in a rotation direction and an armature winding that generates a progressive magnetic field in a linear motion direction. In this type of linear rotary motor, position detectors that detect linear motion displacement and rotational displacement are often collectively disposed on a side opposite to an output shaft. In such arrangement of the position detectors, the length of the linear rotary motor in the linear motion direction increases as the length of linear motion of the mover increases, so that the overall length of the motor increases.

Patent Literature 1 discloses a linear drive including a timing ruler and a sensor. The timing ruler is provided on an outer periphery of a magnet system. The sensor faces the timing ruler.

CITATION LIST

Patent Literature

Patent Literature 1: Japanese Patent Application Laid-open No. 2011-147333

SUMMARY OF INVENTION

Problem to be Solved by the Invention

In Patent Literature 1, the timing ruler is long and narrow, and extends in an axial direction of a shaft. Therefore, when a mover rotates, the timing ruler cannot be detected by the sensor, so that a linear motion position cannot be detected. For this reason, a slide pin bolt and a hole that prevent rotation of the mover are provided in the linear drive disclosed in Patent Literature 1. The problem with the linear drive disclosed in Patent Literature 1 is that since a configuration for preventing rotation of the mover is provided, the structure of a motor becomes large and complicated.

The present disclosure has been made in view of the above, and an object of the present disclosure is to obtain a linear rotary motor that achieves downsizing of the motor and simplification of a structure thereof.

Means to Solve the Problem

In order to solve the above-described problems and achieve the object, a linear rotary motor according to the present disclosure includes: a frame including a cylindrical frame body; a stator including a linear motion coil and a rotation coil, the linear motion coil being disposed on an inner peripheral wall of the frame body, the linear motion coil generating a linearly moving magnetic field in a linear motion direction, the linear motion coil and the rotation coil being coaxially arranged, the rotation coil generating a rotating magnetic field in a rotation direction; and a mover including a shaft and a magnet, the shaft being supported by the frame in such a way as to be rectilinearly movable and rotatable, the shaft including an output shaft, the magnet being provided on an outer periphery of the shaft, the linear motion coil and the rotation coil being energized to cause the mover to move rectilinearly and rotate. The linear rotary motor includes: a linear motion detector that detects a position of the mover in the linear motion direction, the linear motion detector being disposed on the frame or the stator in such a way as to face the magnet; and a linear motion scale provided on an outer periphery of the mover, the linear motion scale being provided over a range of motion in the linear motion direction and a range of rotation in a circumferential direction so as to face the linear motion detector when the mover moves rectilinearly or rotates.

Effects of the Invention

The linear rotary motor of the present disclosure has the effect of achieving downsizing of the motor and simplification of a structure thereof.

BRIEF DESCRIPTION OF DRAWINGS

FIG. 10 is a sectional side view of a linear rotary motor according to a sixth embodiment.

FIG. 13 is a sectional side view of a linear rotary motor according to a ninth embodiment.

FIG. 17 is a sectional side view of a linear rotary motor according to a thirteenth embodiment.

DESCRIPTION OF EMBODIMENTS

Hereinafter, linear rotary motors according to embodiments will be described in detail with reference to the drawings.

First Embodiment

Figure 1:
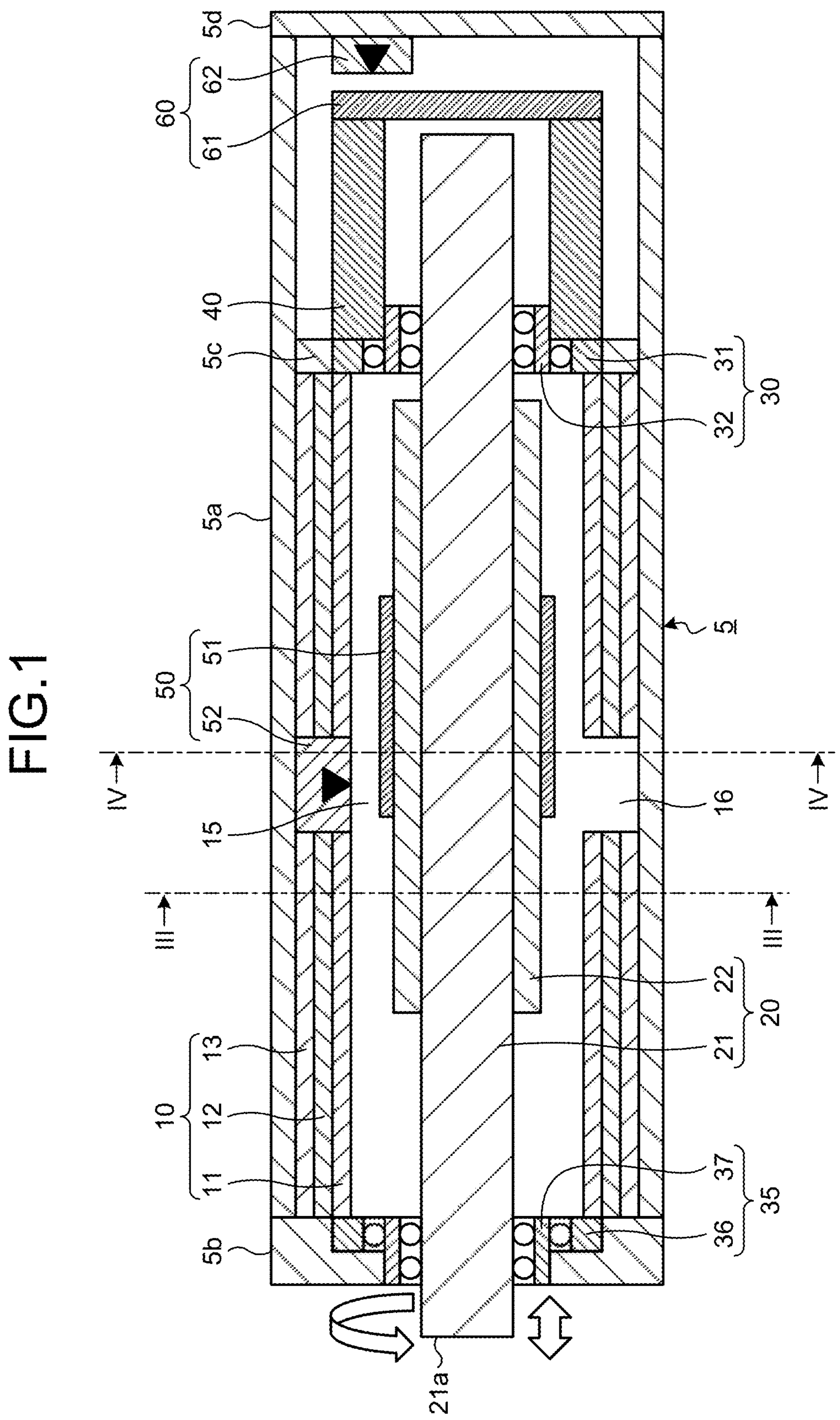
FIG. 1 is a sectional side view of a linear rotary motor according to a first embodiment.
Figure 2:
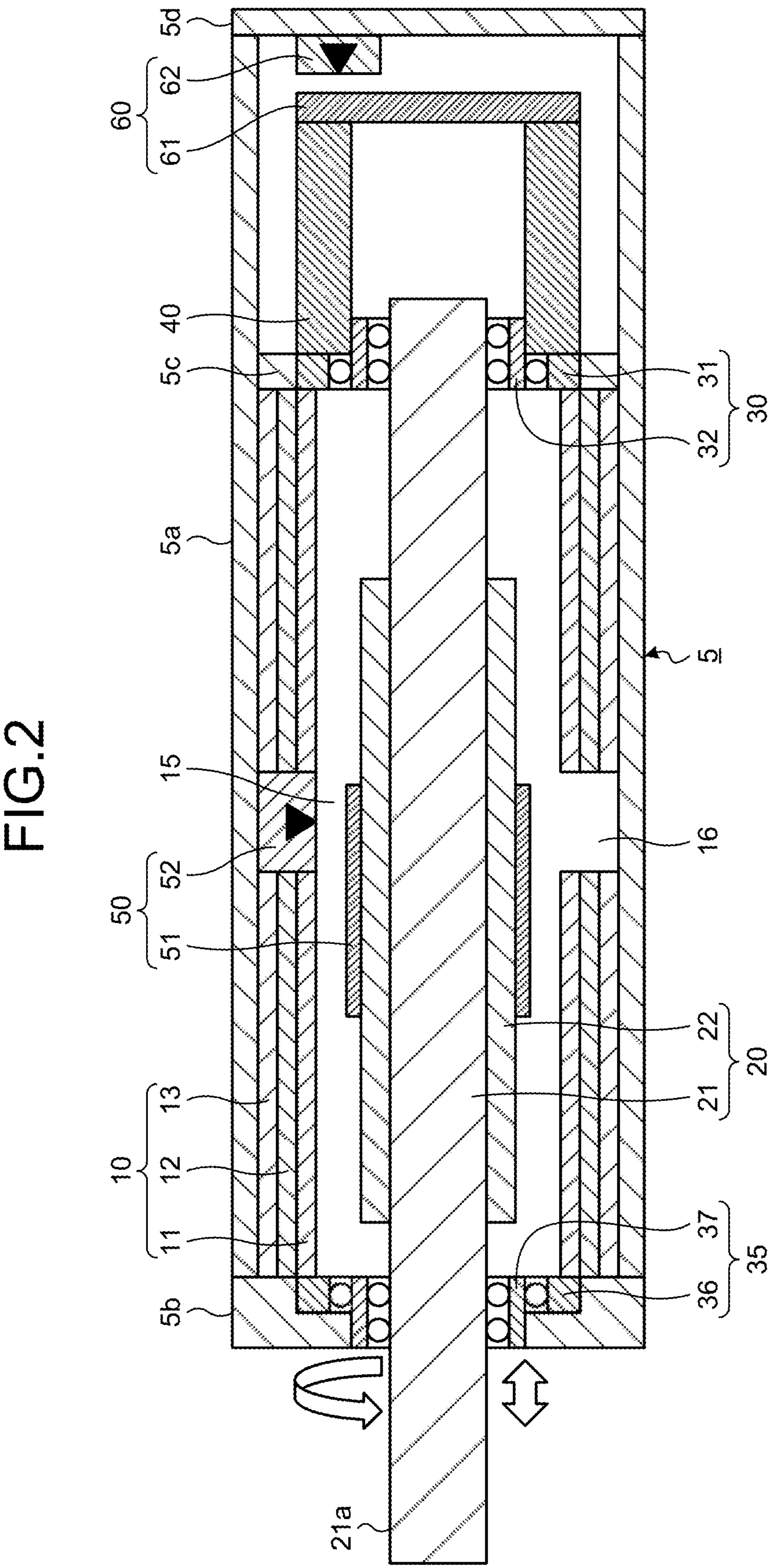
FIG. 2 is a sectional side view of the linear rotary motor according to the first embodiment in a state where an output shaft of the linear rotary motor has moved rectilinearly and rotated.
Figure 3:
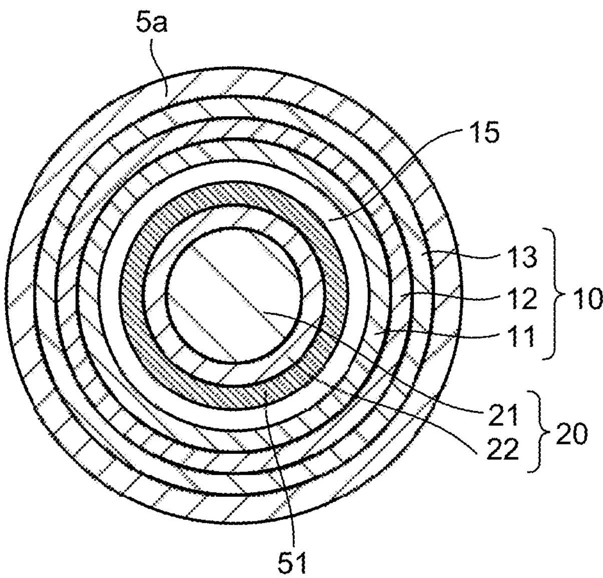
FIG. 3 is a cross-sectional view of the linear rotary motor according to the first embodiment.
Figure 4:
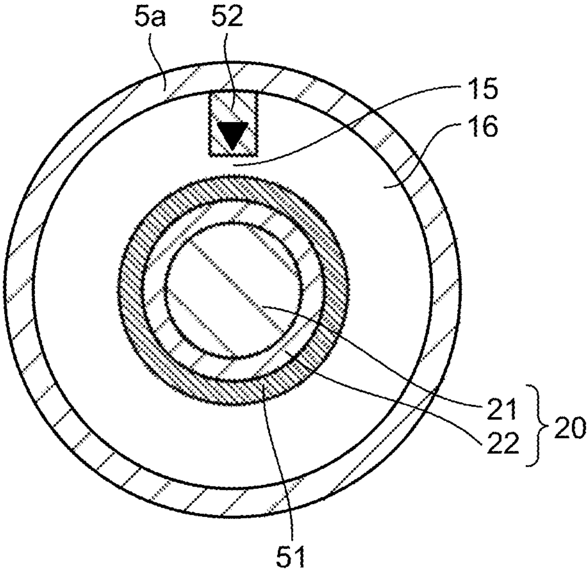
FIG. 4 is a cross-sectional view of the linear rotary motor according to the first embodiment.

FIG. 1 is a sectional side view of a linear rotary motor according to a first embodiment. FIG. 2 is a sectional side view of the linear rotary motor according to the first embodiment in a state where an output shaft of the linear rotary motor has moved rectilinearly and rotated. FIG. 3 is a cross-sectional view of the linear rotary motor according to the first embodiment. FIG. 3 is a cross-sectional view taken along line III-III illustrated in FIG. 1. FIG. 4 is a cross-sectional view of the linear rotary motor according to the first embodiment. FIG. 4 is a cross-sectional view taken along line IV-IV illustrated in FIG. 1. The linear rotary motor includes a frame 5 which is a cylindrical housing. The frame 5 includes a frame body 5*a*, a first end plate 5*b*, an intermediate plate 5*c*, and a second end plate 5*d*. The frame body 5*a* is hollow and in a cylindrical shape. A motor unit and a position detection unit are incorporated in the frame 5.

The motor unit includes a stator 10 and a mover 20. The stator 10 includes a linear motion coil (propulsion coil) 11, a rotation coil 12, and a stator core 13. The mover 20 includes a shaft 21 and a magnet 22 which is a field magnet. The magnet 22 is disposed on an outer periphery of the shaft 21. The shaft 21 of the mover 20 is supported by a pair of linear motion rotation bearings 30 and 35 such that the shaft 21 can move in a linear motion direction and rotate in a rotation direction. That is, the shaft 21 is supported by the frame 5 in such a way as to be rectilinearly movable and rotatable.

The position detection unit includes a linear motion position detection unit 50 and a rotational position detection unit 60. The linear motion position detection unit 50 detects a position of the mover 20 in the linear motion direction. The rotational position detection unit 60 detects a position of the mover 20 in the rotation direction. The linear motion position detection unit 50 includes a linear motion scale 51 and a linear motion detector 52. The linear motion scale 51 is disposed on the mover 20. The linear motion detector 52 reads the linear motion scale 51. The rotational position detection unit 60 includes a rotation scale 61 and a rotation detector 62. The rotation scale 61 is coupled to the mover 20. The rotation detector 62 reads the rotation scale 61. Hereinafter, the linear motion direction of the mover 20 may be simply referred to as a linear motion direction.

As illustrated in FIG. 3, the linear motion coil 11 and the rotation coil 12 of the stator 10 are coaxially arranged. When linear motion coil 11 and the rotation coil 12 are energized by current controlled separately for the linear motion coil 11 and the rotation coil 12, a linearly moving magnetic field is generated in the linear motion direction, and a rotating magnetic field is generated in the rotation direction. These magnetic fields and the magnet 22 of the mover 20 attract and repel each other. As a result, the mover 20 moves in the linear motion direction and the rotation direction. The stator core 13 is disposed on an outer side of the linear motion coil 11 and the rotation coil 12. As a result, the magnetic flux of the magnet 22 can be effectively used, so that the thrust and torque of the motor are improved. Note that in order to reduce the weight of the motor, only the linear motion coil 11 and the rotation coil 12 may be disposed in the stator 10 without the stator core 13 being disposed in the stator 10. Since the linear motion coil 11 is disposed closer to the inner side of the stator 10 than the rotation coil 12, leakage flux is reduced to improve the thrust of the motor. Note that when it is desired to improve torque rather than thrust, the rotation coil 12 may be disposed closer to the radially inner side of the stator 10 than the linear motion coil 11. A configuration in which the stator core 13 is not disposed in the stator 10, and the stator 10 includes only the linear motion coil 11 and the rotation coil 12, as described above, may be applied to each embodiment to be described below.

The magnet 22 of the mover 20 generates electromagnetic force in both the linear motion direction and the rotation direction. Therefore, in the magnet 22, the N-poles and S-poles of rhombic magnets are alternately arranged in the linear motion direction and the rotation direction. Note that in order to reduce the number of magnets, rectangular N-poles and S-poles may be alternately arranged. Alternatively, in order to reduce the cost of magnets, it is possible to adopt a claw-pole structure in which the N-poles and S-poles of cylindrical magnets magnetized in the linear motion direction are alternately arranged and iron cores are each disposed between the magnets. Furthermore, in order to improve thrust and torque, it is possible to use a Halbach array in which magnets magnetized in a direction parallel to the surface of the mover 20 are each disposed between the N-poles and S-poles of rhombic magnets. In addition, it is possible to adopt not only a surface magnet type but also a magnet embedded type in which a magnet is embedded in an iron core.

The shaft 21 includes an output shaft 21*a* exposed to the outside of the first end plate 5*b* on one end of the frame 5. The linear motion rotation bearing 35 serving as a first linear motion rotation bearing disposed on the first end plate 5*b* on the output shaft 21*a* side includes a bearing 36 and a ball spline 37. The linear motion rotation bearing 30 serving as a second linear motion rotation bearing disposed on the intermediate plate 5*c* opposite the first end plate 5*b* includes a bearing 31 and a ball spline 32. A combination of a bearing and a sliding bush, a stroke bush, a sliding rotary bush, a linear rotary bush, a linear ball bush, or a sliding bearing may be used as the linear motion rotation bearings 30 and 35 so as to reduce cost.

The linear motion scale 51 included in the linear motion position detection unit 50 is disposed in a gap 15 which is a gap between the magnet 22 and the linear motion coil 11 which is a coil on the inner side. In the first embodiment, the linear motion scale 51 is disposed on an outer periphery of the mover 20 in the gap 15. Specifically, the linear motion scale 51 is disposed on an outer peripheral surface of the magnet 22 in the gap 15. As illustrated in FIGS. 1 and 2, the length of the linear motion scale 51 in the linear motion direction corresponds to a stroke length that is a range of motion of the mover 20 in the linear motion direction. In addition, as illustrated in FIGS. 3 and 4, the linear motion scale 51 is provided over a range of rotation of the mover 20 in a circumferential direction. In the first embodiment, the linear motion scale 51 is disposed over the entire circumference of the mover 20.

As illustrated in FIGS. 1 and 4, the linear motion detector 52 included in the linear motion position detection unit 50 is disposed on the frame body 5*a* of the frame 5 in such a way as to face the magnet 22. Furthermore, the linear motion detector 52 is provided on an inner peripheral wall of the frame body 5*a* of the frame 5, within a range of linear motion of the linear motion scale 51. In the first embodiment, the linear motion detector 52 is disposed at a midpoint between positions where the linear motion rotation bearings 30 and 35 are located in the linear motion direction. As illustrated in FIGS. 1 and 4, a space 16 extending over the entire range in the circumferential direction is provided at a single position in the center of the stator core 13, the linear motion coil 11, and the rotation coil 12 extending in the linear motion direction. The center refers to a center with respect to the linear motion direction. The linear motion detector 52 is disposed in the space 16 in such a way as to be sandwiched between the stator core 13 and the stator core 13, sandwiched between the linear motion coil 11 and the linear motion coil 11, and sandwiched between the rotation coil 12 and the rotation coil 12. That is, the stator core 13, the linear motion coil 11, and the rotation coil 12 are separated in the linear motion direction, and the linear motion detector 52 is disposed in the separated stator core 13, linear motion coil 11, and rotation coil 12. Note that when the stator core 13 is present, the linear motion detector 52 may be disposed in such a way as to be sandwiched only between the stator core 13 and the stator core 13, or may be disposed in such a way as to be sandwiched only between the stator core 13 and the stator core 13 and between the rotation coil 12 and the rotation coil 12 which is a coil on the outer side. In addition, when the stator core 13 is not present, the linear motion detector 52 may be disposed in such a way as to be sandwiched only between the rotation coil 12 and the rotation coil 12 which is a coil on the outer side. Various ways of disposing the linear motion detector 52 in a radial direction as described above may be applied to each embodiment to be described below in which the linear motion coil 11, the rotation coil 12, and the stator core 13 are coaxially provided.

As described above, the linear motion scale 51 is disposed on the outer surface of the magnet 22, and is provided in such a way as to cover the entire range of motion in the linear motion direction and the entire range of rotation in the circumferential direction such that the linear motion scale 51 constantly faces the linear motion detector 52 when the mover 20 moves rectilinearly or rotates. Therefore, a position of the mover in the linear motion direction can be detected over the entire range of the stroke length and over the entire range from 0 degrees to 360 degrees in the circumferential direction.

The linear motion scale 51 is an optical scale in which graduations extending in one direction have been arranged on an entire sheet-like member, and is fixed to the surface of the magnet 22 of the mover 20 with adhesive. Since the linear motion scale 51 is an optical scale, the linear motion scale 51 is not affected by magnetic fields of the magnet 22, the linear motion coil 11, and the rotation coil 12 even when disposed in the gap 15 between the magnet 22 and the linear motion coil 11. Note that the linear motion scale 51 may be bonded to the outer periphery of the magnet 22. Alternatively, graduations may be directly formed on a cylindrical metal member which is disposed on the outer periphery of the magnet 22. Alternatively, a magnet may be embedded in the metal member on which graduations have been formed so that the metal member may have both the function of the linear motion scale 51 and the function of holding the magnet 22.

The rotation detector 62 included in the rotational position detection unit 60 is fixed to the second end plate 5*d* on a side opposite to the first end plate 5*b* on a side where the output shaft 21*a* is disposed. The rotation scale 61 of the rotational position detection unit 60 is disposed on a side closer to an end of the shaft 21 opposite to the output shaft 21*a*. The entire circumference of the rotation scale 61 is graduated in the rotation direction. The rotation detector 62 reads graduations of the rotation scale 61. In order to prevent the end of the shaft 21 on a side opposite to the output shaft 21*a* from moving in the linear motion direction, a rotation scale attaching portion 40 is provided. The rotation scale attaching portion 40 has a hollow structure with the ball spline 32 incorporated therein. The rotation scale attaching portion 40 is fixed to an outer periphery of the ball spline 32. The rotation scale 61 is fixed to the rotation scale attaching portion 40 and rotates, but does not move in the linear motion direction. The rotation scale 61 is an optical scale. Note that a magnetic detector and a magnetic scale may be used as the rotation detector 62 and the rotation scale 61, respectively, so as to reduce cost.

The linear motion scale 51 is provided on the surface of the magnet 22 in such a way as to cover the entire range of motion in the linear motion direction and the entire range of rotation in the circumferential direction. Therefore, even when the mover 20 moves in the linear motion direction and rotates in the rotation direction to shift from the state illustrated in FIG. 1 to the state illustrated in FIG. 2, the linear motion detector 52 and the linear motion scale 51 face each other at a constant distance, and the rotation detector 62 and the rotation scale 61 also face each other at a constant distance.

As described above, according to the first embodiment, the linear motion scale 51 is disposed on the surface of the magnet 22 of the mover 20, the linear motion scale 51 is provided in the gap 15 between the stator 10 and the mover 20, and the linear motion scale 51 is disposed in such a way as to cover the entire range of motion in the linear motion direction and the entire range of rotation in the circumferential direction. Therefore, a configuration for preventing rotation of the mover is not necessary. As a result, downsizing of the motor and simplification of the structure thereof are achieved.

Second Embodiment

Figure 5:
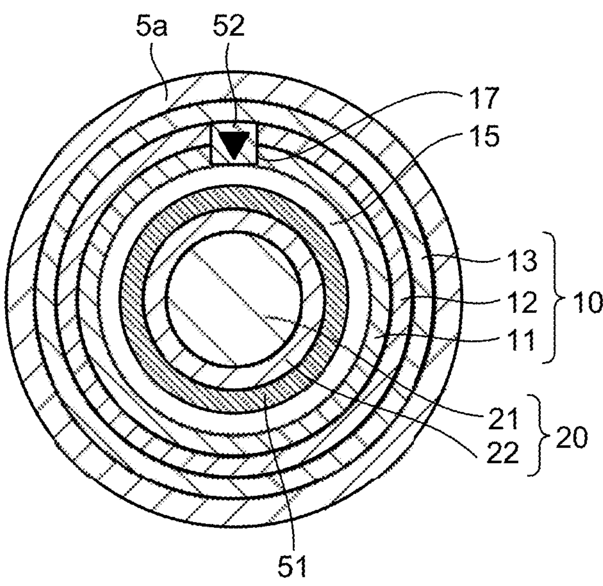
FIG. 5 is a cross-sectional view of a linear rotary motor according to a second embodiment.

FIG. 5 is a cross-sectional view of a linear rotary motor according to a second embodiment. FIG. 5 corresponds to a cross-sectional view taken along line IV-IV in FIG. 1. A cross section of the linear rotary motor according to the second embodiment taken along line III-III in FIG. 1 is the same as the cross section illustrated in FIG. 3.

The second embodiment is different from the first embodiment in the way of disposing the linear motion detector 52. Except for this point, the second embodiment is the same as the first embodiment, and redundant description will be omitted. In the first embodiment, the space 16 extending over the entire range in the circumferential direction is provided at a single position in the center of the stator core 13, the linear motion coil 11, and the rotation coil 12. The center refers to a center with respect to the linear motion direction. In the second embodiment, a recess 17 capable of accommodating the linear motion detector 52 is provided at a single position in the center of the linear motion coil 11 and the rotation coil 12 with respect to the linear motion direction, and the linear motion detector 52 is inserted into the recess 17. The linear motion detector 52 is disposed on an inner peripheral surface of the stator core 13. Note that the recess 17 may be formed in such a way as to extend to the stator core 13 so as to dispose the linear motion detector 52 on the inner peripheral wall of the frame body 5*a* of the frame 5.

In addition to the effects of the first embodiment, the second embodiment achieves the effects of reducing motor loss by increasing the volumes of the linear motion coil 11 and the rotation coil 12 and reducing cost by integrally producing the linear motion coil 11, the rotation coil 12, and the linear motion detector 52. Note that one of the linear motion coil 11 and the rotation coil 12, or both the linear motion coil 11 and the rotation coil 12 may be formed of a printed board or a flexible board so that the linear motion detector 52 may be mounted on these boards.

Third Embodiment

Figure 6:
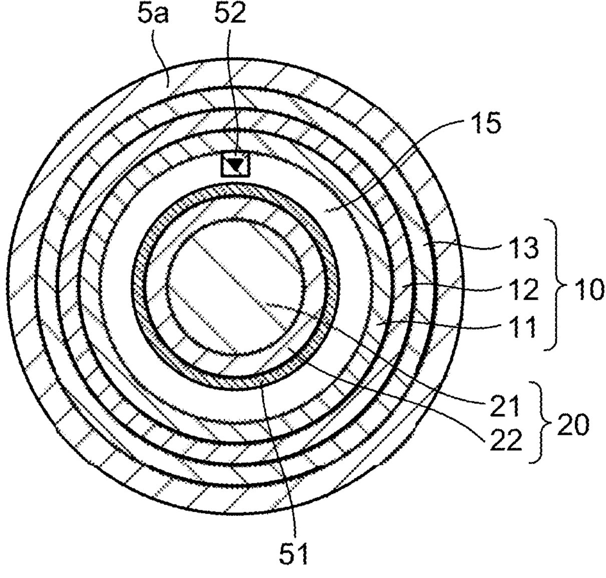
FIG. 6 is a cross-sectional view of a linear rotary motor according to a third embodiment.

FIG. 6 is a cross-sectional view of a linear rotary motor according to a third embodiment. FIG. 6 corresponds to a cross-sectional view taken along line IV-IV in FIG. 1. A cross section of the linear rotary motor according to the third embodiment taken along line III-III in FIG. 1 is the same as the cross section illustrated in FIG. 3.

The third embodiment is different from the first embodiment in the way of disposing the linear motion detector 52. Except for this point, the third embodiment is the same as the first embodiment, and redundant description will be omitted. In the third embodiment, the linear motion detector 52 is disposed on a surface of the linear motion coil 11 which is a radially inner coil. The linear motion detector 52 may be bonded to the surface of the linear motion coil 11. Alternatively, the linear motion coil 11 may be formed of a printed board or a flexible board so that the linear motion detector 52 may be mounted on surfaces of these boards. Note that a configuration in which the linear motion detector 52 is disposed on the surface of the coil on the inner side may be applied to each embodiment to be described below.

The distance between the linear motion detector 52 and the linear motion scale 51 can be reduced in the third embodiment. Therefore, the third embodiment achieves the effect of improving the positional accuracy, in addition to the effects of the first embodiment.

Fourth Embodiment

Figure 7:
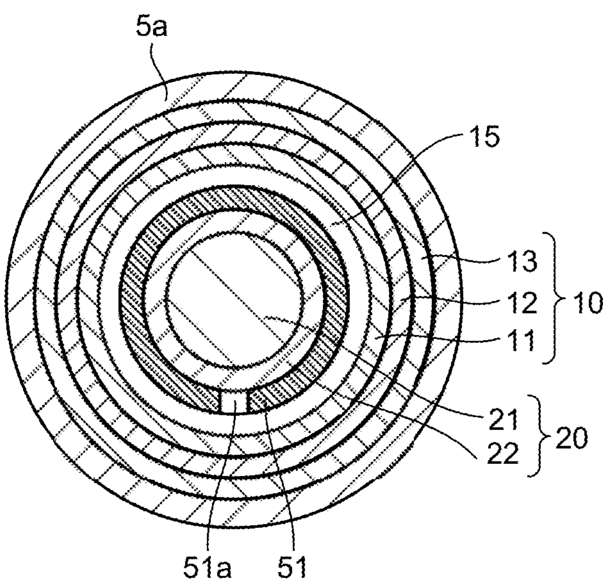
FIG. 7 is a cross-sectional view of a linear rotary motor according to a fourth embodiment.
Figure 8:
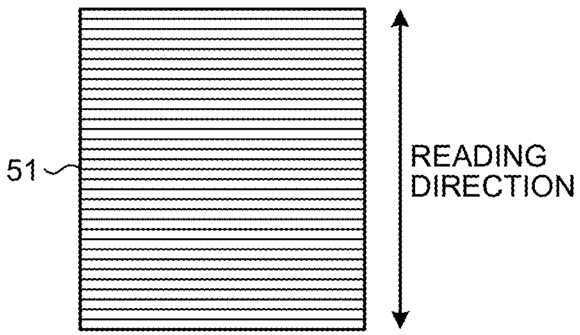
FIG. 8 is a developed view of an example of a linear motion scale included in the linear rotary motor according to the fourth embodiment.

FIG. 7 is a cross-sectional view of a linear rotary motor according to a fourth embodiment. FIG. 7 corresponds to a cross-sectional view taken along line III-III illustrated in FIG. 1. FIG. 8 is a developed view of an example of the linear motion scale 51 included in the linear rotary motor according to the fourth embodiment. The cross section of the linear rotary motor according to the fourth embodiment taken along line IV-IV in FIG. 1 is the same as the cross section illustrated in any one of FIGS. 4, 5, and 6.

The fourth embodiment is different from the first embodiment in the way of disposing the linear motion scale 51. Except for this point, the fourth embodiment is the same as any one of the first to third embodiments, and redundant description will be omitted. In the linear motion scale 51 of the fourth embodiment, a sheet-like member is fixed to the surface of the magnet 22 of the mover 20 with adhesive, and a joint portion 51*a* of the sheet-like member corresponds to a region undetectable by the linear motion detector 52. Therefore, in the fourth embodiment, the range of rotation of the mover 20 in the circumferential direction is limited so that the linear motion detector 52 and the joint portion 51*a* do not face each other. In addition, the linear motion scale 51 is an optical scale in which graduations have been continuously formed in one direction at intervals on the entire sheet-like member, as illustrated in FIG. 8. Thus, displacement of the sheet-like member in the linear motion direction can be detected by the linear motion detector 52 reading the linear motion scale 51 along a reading direction. Note that the linear motion scale 51 illustrated in FIG. 8 also exemplifies the linear motion scale 51 included in the linear rotary motor of each embodiment other than the fourth embodiment.

According to the fourth embodiment, it is not necessary to dispose the linear motion scale 51 over the entire circumference of the mover 20. Thus, the fourth embodiment achieves the effect of reducing the cost of the linear motion scale 51, in addition to the effects of the first embodiment.

Fifth Embodiment

Figure 9:
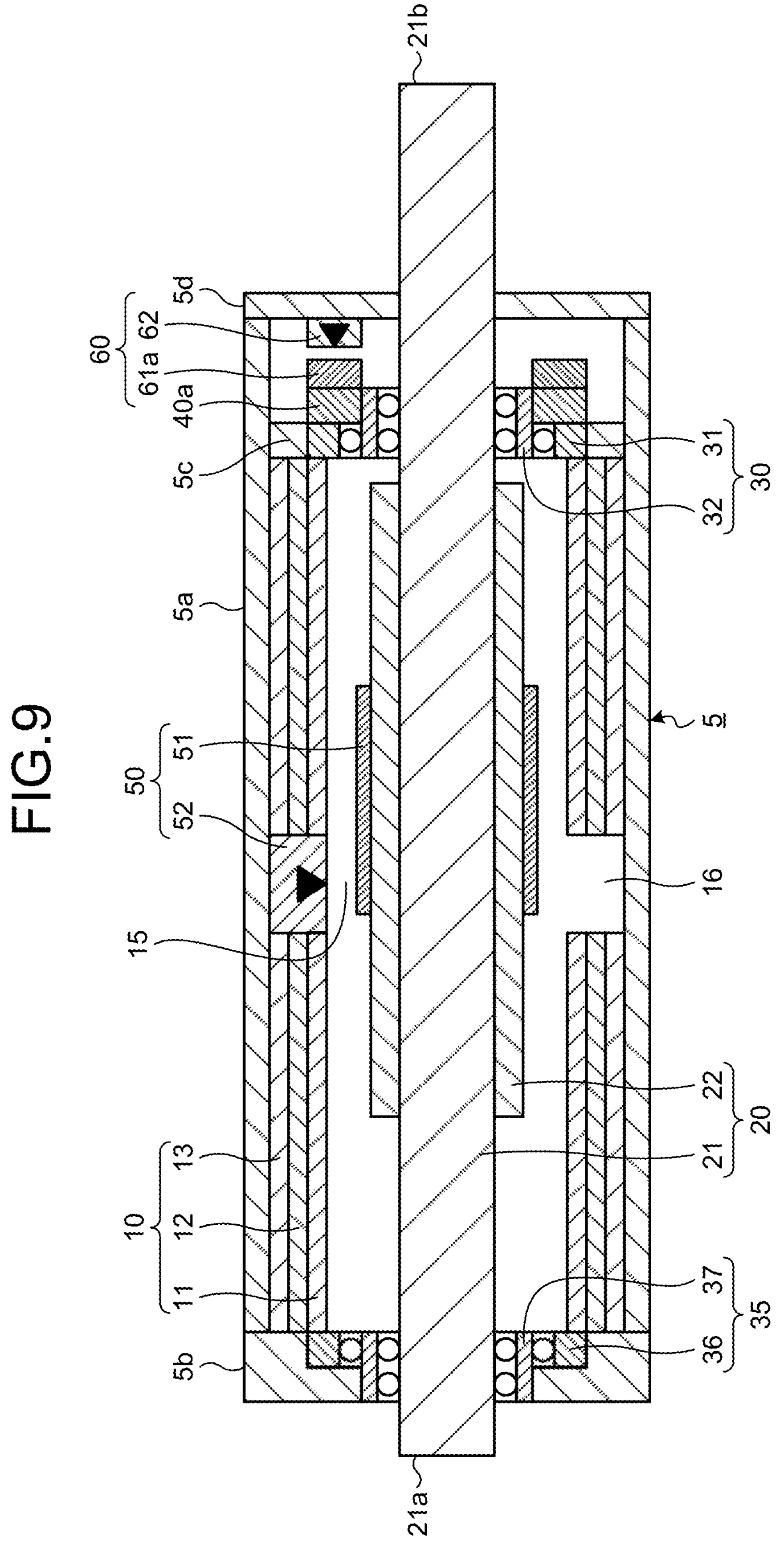
FIG. 9 is a sectional side view of a linear rotary motor according to a fifth embodiment.

FIG. 9 is a sectional side view of a linear rotary motor according to a fifth embodiment. In the fifth embodiment, a rotation scale 61*a* has a doughnut-shaped hollow structure. In addition, a rotation scale attaching portion 40*a* is smaller in length than the rotation scale attaching portion 40 in FIG. 1 in the axial direction of the shaft 21. Furthermore, a hole for exposing a shaft portion 21*b* of the shaft 21 on a side opposite to the output shaft 21*a* is formed in the second end plate 5*d* of the frame 5. Thus, the shaft portion 21*b* of the shaft 21 is exposed to the outside from the second end plate 5*d* of the frame 5. Except for this point, the fifth embodiment is the same as the first embodiment, and redundant description will be omitted.

As described above, according to the fifth embodiment, since the rotation scale 61*a* has a hollow structure, the shaft 21 of the mover 20 and the rotation scale 61*a* do not interfere with each other. Thus, the shaft portion 21*b* of the shaft 21 on the side opposite to the output shaft 21*a* can be exposed from the frame 5. Therefore, in addition to the effects of the first embodiment, the fifth embodiment achieves the effect of reducing the size of the rotational position detection unit 60 in the linear motion direction by the stroke length of the mover 20.

Sixth Embodiment

Figure 10:
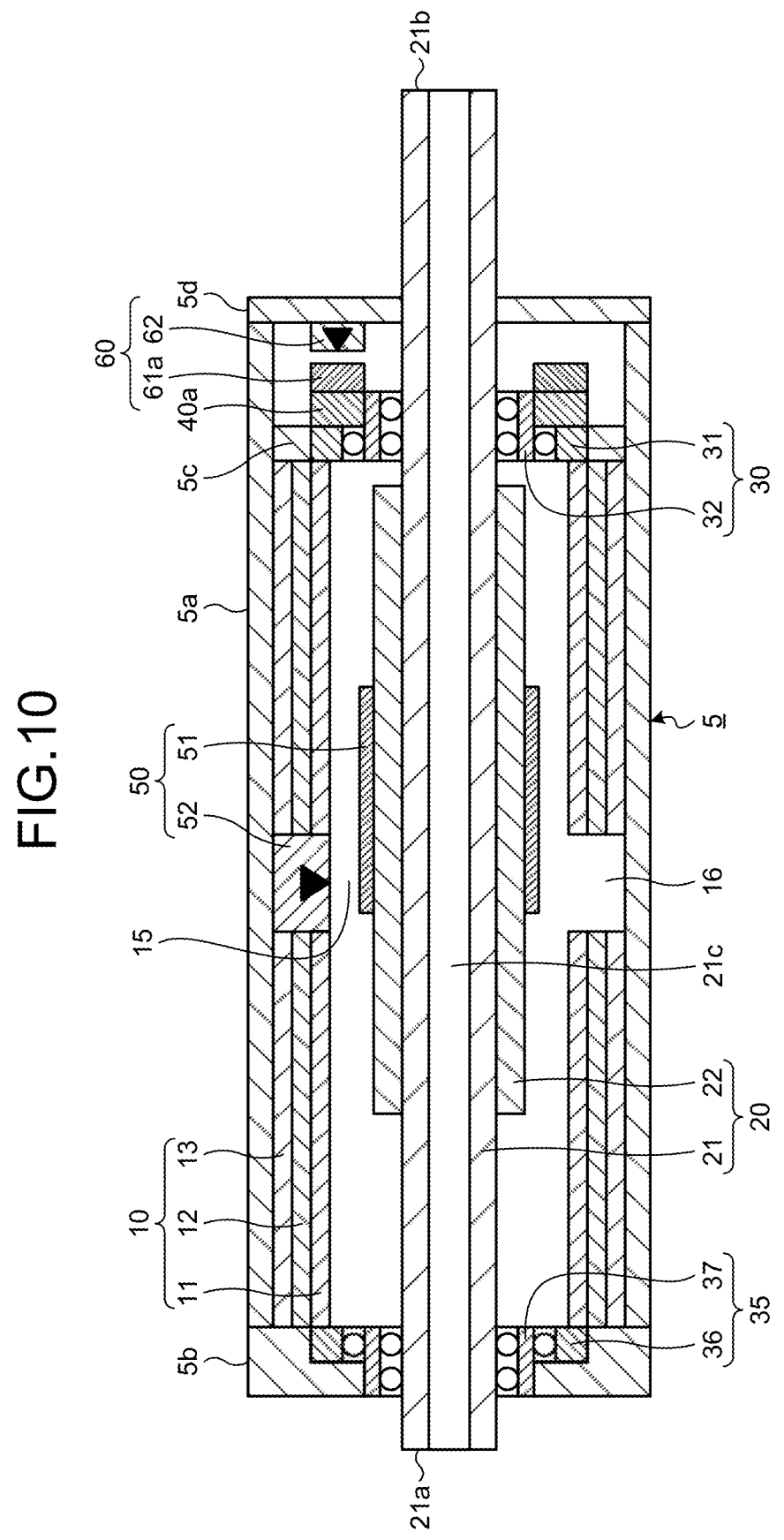

FIG. 10 is a sectional side view of a linear rotary motor according to a sixth embodiment. In the sixth embodiment, the shaft 21 has a hollow structure, and a through-hole 21*c* is provided in the shaft 21. Except for this point, the sixth embodiment is the same as the fifth embodiment, and redundant description will be omitted. In the sixth embodiment, a vacuum ejector is inserted into the through-hole 21*c* of the shaft portion on the side opposite to the output shaft 21*a*, so that the inside of the shaft 21 can be depressurized.

According to the sixth embodiment, since the shaft 21 has a hollow structure, the inside of the shaft 21 can be depressurized without use of a tube as a separate part. Therefore, parts can be attracted by the output shaft 21*a* of the shaft 21. Thus, the sixth embodiment achieves the effect of facilitating device assembly and device maintenance, in addition to the effects of the first embodiment. Note that a configuration in which the shaft 21 has a hollow structure and the through-hole 21*c* is provided in the shaft 21 may be applied to any of the first to fourth embodiments and seventh to fifteenth embodiments.

Seventh Embodiment

Figure 11:
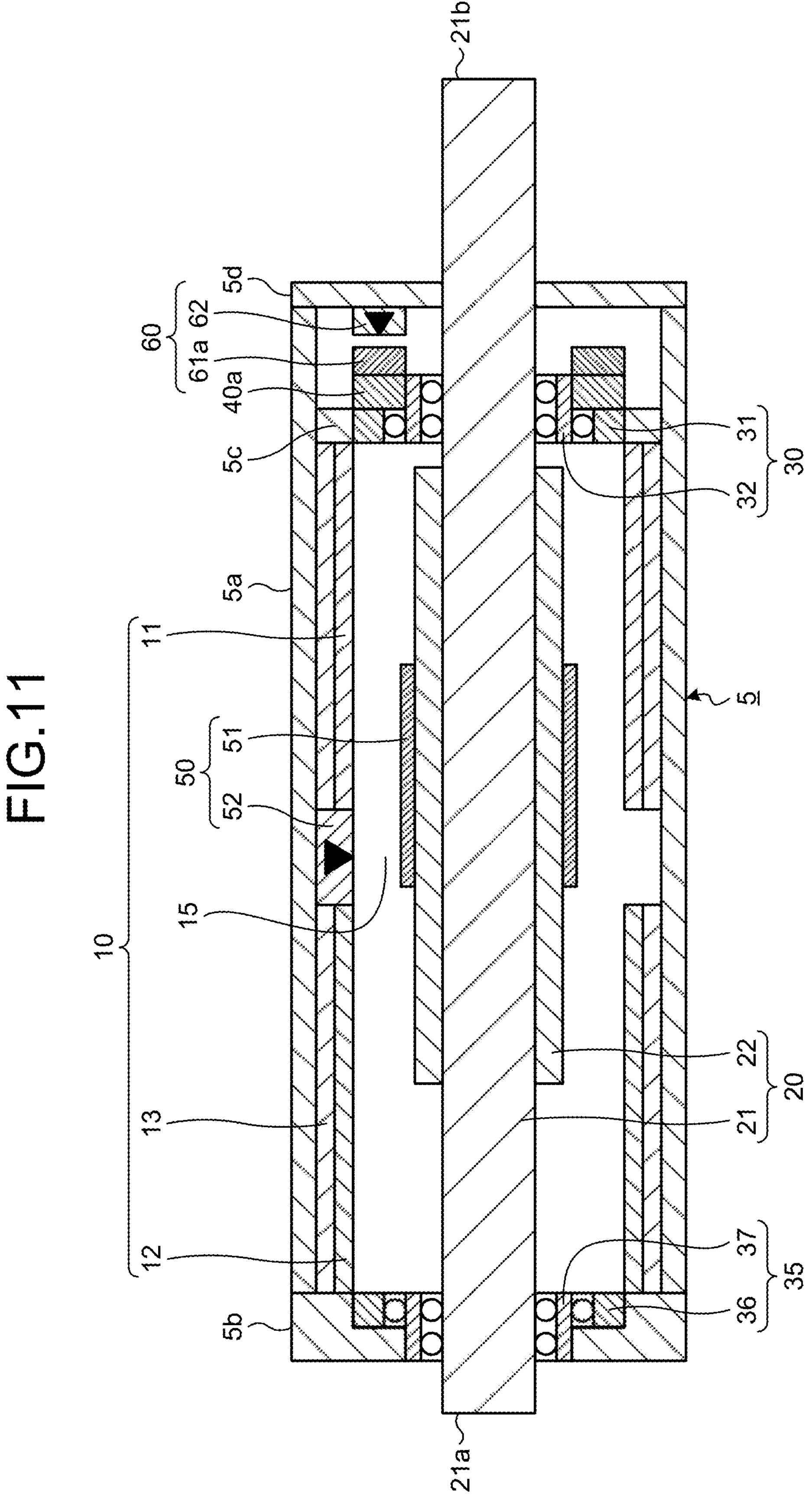
FIG. 11 is a sectional side view of a linear rotary motor according to a seventh embodiment.

FIG. 11 is a sectional side view of a linear rotary motor according to a seventh embodiment. In the seventh embodiment, the linear motion coil 11 and the rotation coil 12 are separated from each other in the linear motion direction, and the linear motion detector 52 is disposed between the linear motion coil 11 and the rotation coil 12. The linear motion detector 52 is fixed to the inner peripheral wall of the frame body 5*a* of the frame 5. Except for this point, the seventh embodiment is the same as the fifth embodiment, and redundant description will be omitted. The sum of lengths of the linear motion coil 11 and the rotation coil 12 in the linear motion direction is larger than a length of the magnet 22 in the linear motion direction. Therefore, the area of a part of the linear motion coil 11 facing the magnet 22 and the area of a part of the rotation coil 12 facing the magnet 22 change depending on the position of the mover 20 in the linear motion direction.

In the seventh embodiment, since the linear motion coil 11 and the rotation coil 12 are separately disposed in the linear motion direction, the dimension of the motor can be reduced in the radial direction. In addition, since the area of the part of the linear motion coil 11 facing the magnet 22 and the area of the part of the rotation coil 12 facing the magnet 22 change, that is, a thrust constant and a torque constant change, depending on the position of the mover 20 in the linear motion direction, it is possible to reduce motor loss by generating a current command according to the position of the mover 20 in the linear motion direction.

Eighth Embodiment

Figure 12:
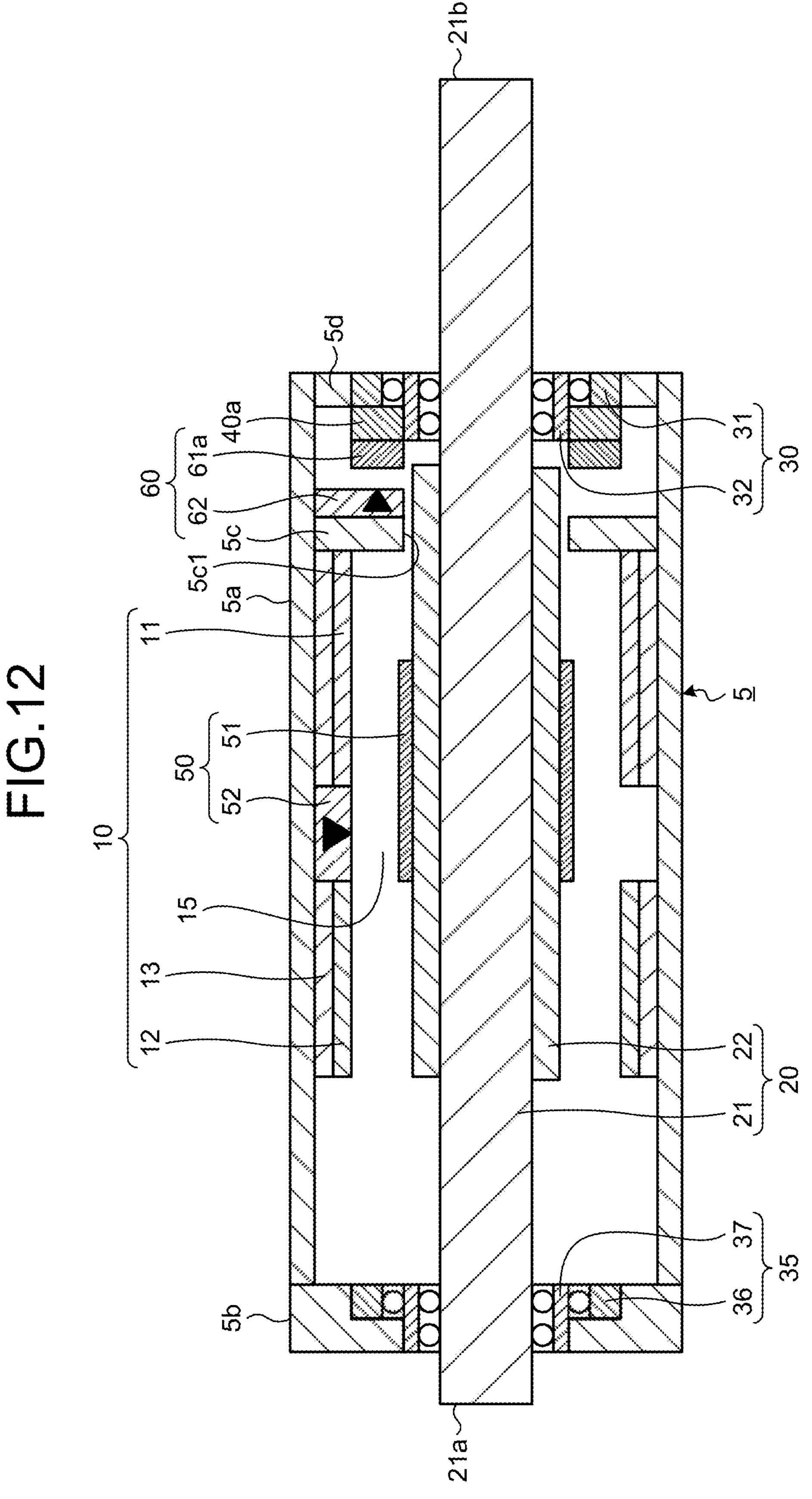
FIG. 12 is a sectional side view of a linear rotary motor according to an eighth embodiment.

FIG. 12 is a sectional side view of a linear rotary motor according to an eighth embodiment. In the eighth embodiment, the linear motion coil 11 and the rotation coil 12 are separated from each other in the linear motion direction, and the linear motion detector 52 is disposed between the linear motion coil 11 and the rotation coil 12. The eighth embodiment is similar to the seventh embodiment in this respect. In the eighth embodiment, the sum of lengths of the linear motion coil 11 and the rotation coil 12 in the linear motion direction is smaller than the length of the magnet 22 in the linear motion direction. Therefore, the area of a part of the linear motion coil 11 facing the magnet 22 and the area of a part of the rotation coil 12 facing the magnet 22 do not change depending on the position of the mover 20.

Furthermore, the linear motion rotation bearing 30 including the bearing 31 and the ball spline 32 is provided not on the intermediate plate 5*c* but on the second end plate 5*d*. The rotation scale attaching portion 40*a* is provided on an outer periphery of the ball spline 32, and rotates as the mover 20 rotates, but does not move in the linear motion direction even when the mover 20 moves rectilinearly. The rotation scale 61*a* is fixed to the rotation scale attaching portion 40*a*. Therefore, the rotation scale 61*a* also rotates as the mover 20 rotates, but does not move in the linear motion direction even when the mover 20 moves rectilinearly.

A hole 5*cl* is formed in the intermediate plate 5*c*. The hole 5*cl* allows the mover 20 to move rectilinearly and rotate. The rotation detector 62 is fixed to the intermediate plate 5*c*, and reads graduations of the rotation scale 61*a* provided at a constant distance. The rotation detector 62 is disposed side by side with a part of the magnet 22 of the mover 20 in the radial direction of the motor. Therefore, the overall length of the linear rotary motor can be reduced in the linear motion direction. Except for this point, the eighth embodiment is the same as the seventh embodiment, and redundant description will be omitted.

According to the eighth embodiment, since the linear motion coil 11 and the rotation coil 12 are separately disposed in the linear motion direction, the dimension of the motor can be reduced in the radial direction. In addition, the area of the part of the linear motion coil 11 facing the magnet 22 and the area of the part of the rotation coil 12 facing the magnet 22 do not change depending on the position of the mover 20. Therefore, it is not necessary to generate a current command in accordance with the position of the mover 20 in the linear motion direction, so that control can be simplified. Furthermore, since the rotation detector 62 and the magnet 22 are arranged side by side in the radial direction of the motor, the overall length of the linear rotary motor can be reduced.

Ninth Embodiment

Figure 13:
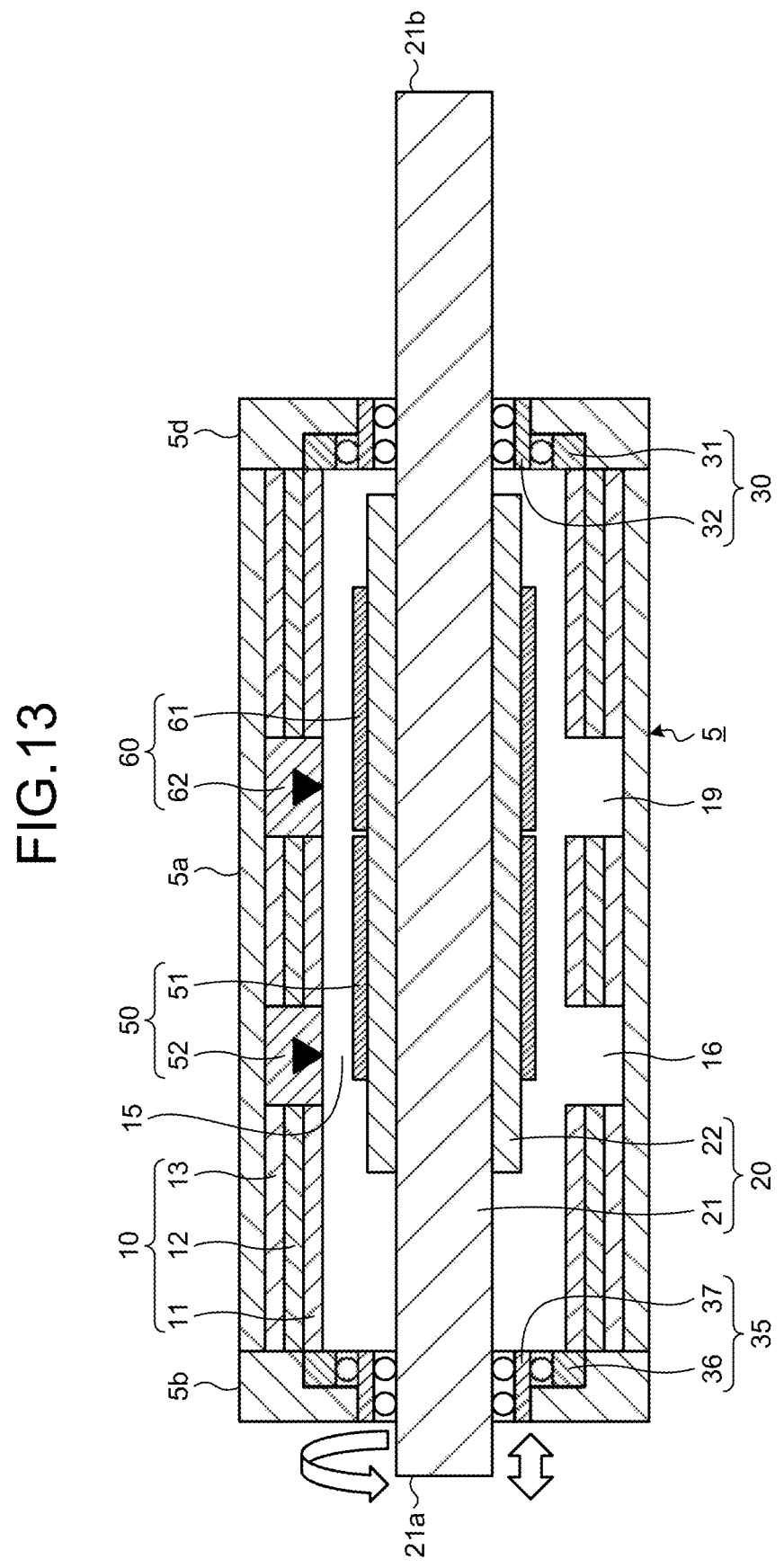

FIG. 13 is a sectional side view of a linear rotary motor according to a ninth embodiment. In the ninth embodiment, unlike the first to eighth embodiments, the rotational position detection unit 60 is not disposed in the space next to the motor unit in the axial direction, the motor unit including the stator 10 and the magnet 22 of the mover 20, but disposed in a space in the motor unit as with the linear motion position detection unit 50. Except for this point, the ninth embodiment is the same as the first embodiment, and redundant description will be omitted.

The linear motion scale 51 and the rotation scale 61 are disposed at different positions in the axial direction on the outer surface of the magnet 22 in the gap 15. Lengths of the linear motion scale 51 and the rotation scale 61 in the linear motion direction each correspond to the stroke length that is the range of motion of the mover 20 in the linear motion direction. Furthermore, the linear motion scale 51 and the rotation scale 61 are provided in such a way as to cover the entire range of motion in the linear motion direction and the entire range of rotation in the circumferential direction. The linear motion scale 51 and the rotation scale 61 are disposed adjacent to each other such that directions of the respective graduations of the linear motion scale 51 and the rotation scale 61 are orthogonal to each other.

As illustrated in FIG. 4, the linear motion detector 52 is disposed in the space 16 formed at the single position in the stator 10 in the linear motion direction in such a way as to face the linear motion scale 51, and is fixed to the inner peripheral wall of the frame body 5*a* of the frame 5. The linear motion detector 52 is disposed in the space 16 in such a way as to be sandwiched between the stator core 13 and the stator core 13, sandwiched between the linear motion coil 11 and the linear motion coil 11, and sandwiched between the rotation coil 12 and the rotation coil 12.

The same applies to the rotation detector 62. The rotation detector 62 is disposed in a space 19 formed at a single position in the stator core 13, the linear motion coil 11, and the rotation coil 12 in the linear motion direction in such a way as to face the rotation scale 61, and is fixed to the inner peripheral wall of the frame body 5*a* of the frame 5. The rotation detector 62 is disposed in the space 19 in such a way as to be sandwiched between the stator core 13 and the stator core 13, sandwiched between the linear motion coil 11 and the linear motion coil 11, and sandwiched between the rotation coil 12 and the rotation coil 12.

Note that when the stator core 13 is present, the linear motion detector 52 and the rotation detector 62 may be disposed in such a way as to be sandwiched only between the stator core 13 and the stator core 13, or may be disposed in such a way as to be sandwiched only between the stator core 13 and the stator core 13 and between the rotation coil 12 and the rotation coil 12 which is a coil on the outer side. In addition, when the stator core 13 is not present, the linear motion detector 52 and the rotation detector 62 may be disposed in such a way as to be sandwiched only between the rotation coil 12 and the rotation coil 12 which is a coil on the outer side. In addition, as illustrated in FIG. 6, the linear motion detector 52 and the rotation detector 62 may be disposed on the surface of one of the linear motion coil 11 and the rotation coil 12, the one being disposed on the inner side.

The ninth embodiment allows the linear motion position detection unit 50 and the rotational position detection unit 60 to have the same configuration. Therefore, the cost of the position detector can be reduced due to parts used in common. Furthermore, since the motor unit and the position detection unit are integrated, the overall length of the motor can be reduced.

Tenth Embodiment

Figure 14:
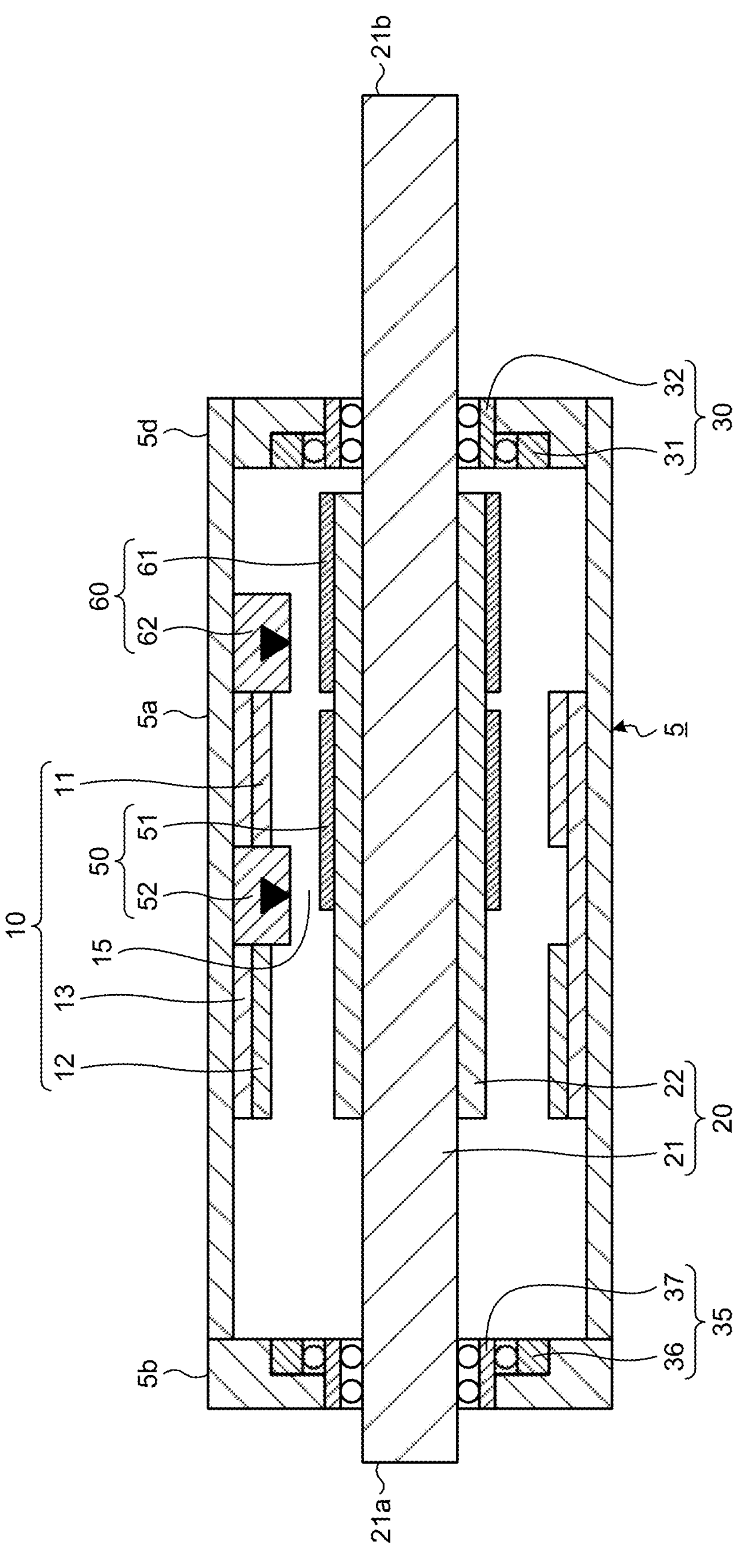
FIG. 14 is a sectional side view of a linear rotary motor according to a tenth embodiment.

FIG. 14 is a sectional side view of a linear rotary motor according to a tenth embodiment. In the tenth embodiment, the rotational position detection unit 60 and the linear motion position detection unit 50 are disposed in the space in the motor unit, as in the ninth embodiment. Furthermore, as in the seventh and eighth embodiments, the linear motion coil 11 and the rotation coil 12 are separated from each other in the linear motion direction.

The linear motion detector 52 is disposed between the linear motion coil 11 and the rotation coil 12. The rotation detector 62 is disposed adjacent to the linear motion coil 11. The linear motion detector 52 and the rotation detector 62 are fixed to the inner peripheral wall of the frame body 5*a* of the frame 5. The linear motion scale 51 and the rotation scale 61 are disposed at different positions in the axial direction on the outer surface of the magnet 22 in the gap 15. The linear motion scale 51 is disposed in such a way as to face the linear motion detector 52, and the rotation scale 61 is disposed in such a way as to face the rotation detector 62. The linear motion scale 51 and the rotation scale 61 are provided in such a way as to cover the entire range of motion in the linear motion direction and the entire range of rotation in the circumferential direction. The linear motion scale 51 and the rotation scale 61 are disposed adjacent to each other such that directions of the respective graduations of the linear motion scale 51 and the rotation scale 61 are orthogonal to each other.

In the tenth embodiment, the sum of lengths of the linear motion coil 11 and the rotation coil 12 in the linear motion direction is smaller than the length of the magnet 22 in the linear motion direction. Therefore, the area of a part of the linear motion coil 11 facing the magnet 22 and the area of a part of the rotation coil 12 facing the magnet 22 do not change depending on the position of the mover 20 in the linear motion direction.

According to the tenth embodiment, since the linear motion coil 11 and the rotation coil 12 are separately disposed in the linear motion direction, the dimension of the motor can be reduced in the radial direction. In addition, since the motor unit and the position detection unit are integrated, the overall length of the motor can be reduced. In addition, the area of the part of the linear motion coil 11 facing the magnet 22 and the area of the part of the rotation coil 12 facing the magnet 22 do not change depending on the position of the mover 20 in the linear motion direction. Therefore, it is not necessary to generate a current command in accordance with the position of the mover 20 in the linear motion direction, so that control can be simplified. Note that the linear motion detector 52 and the rotation detector 62 may be disposed on the surface of either the linear motion coil 11 or the rotation coil 12.

Eleventh Embodiment

Figure 15:
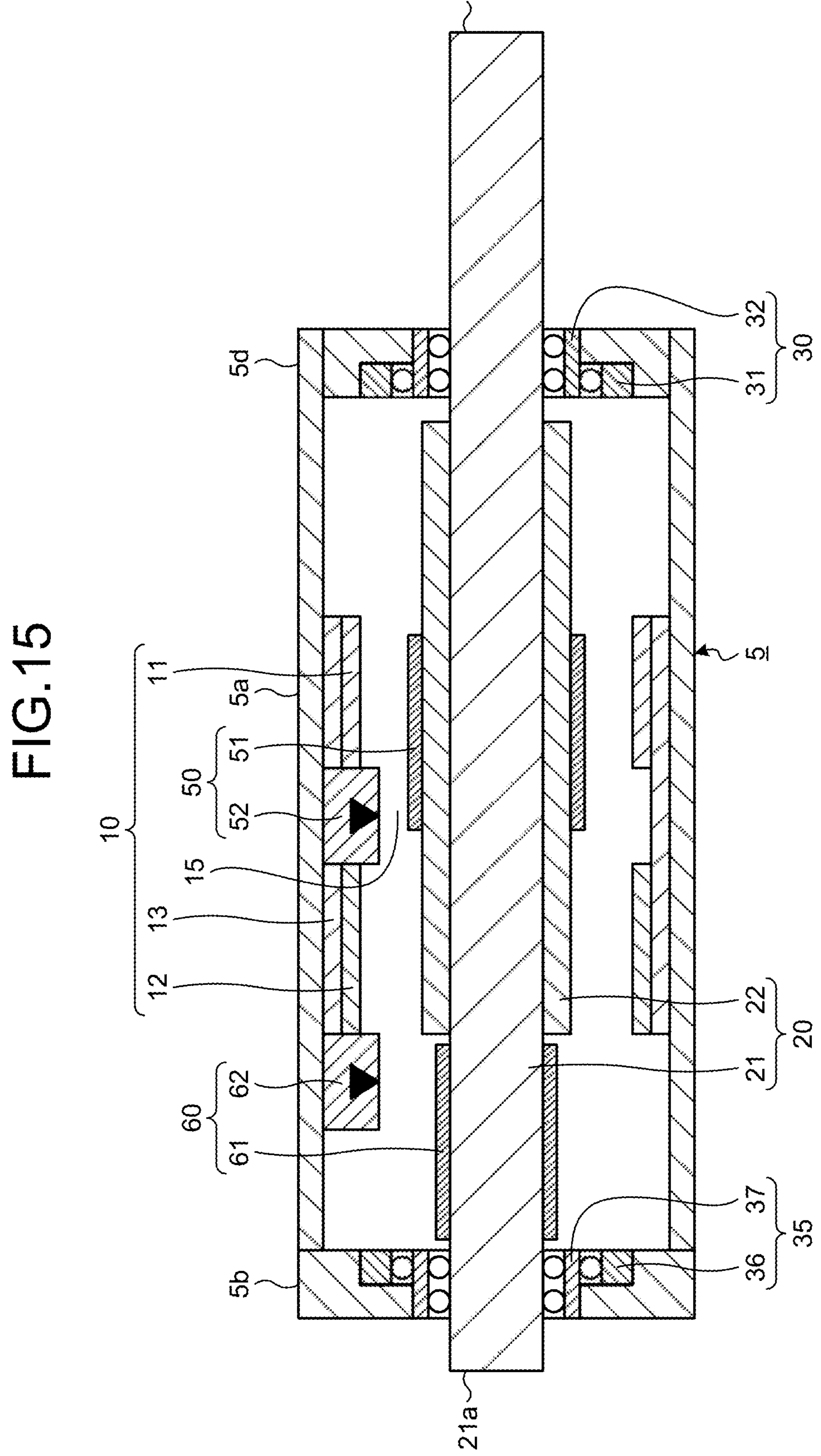
FIG. 15 is a sectional side view of a linear rotary motor according to an eleventh embodiment.

FIG. 15 is a sectional side view of a linear rotary motor according to an eleventh embodiment. In the eleventh embodiment, one of the linear motion position detection unit 50 and the rotational position detection unit 60 is disposed between the magnet 22 and the frame body 5*a* of the frame 5, and the other is disposed between the frame body 5*a* of the frame 5 and a portion of the shaft 21, on which portion the magnet 22 is not located. In FIG. 15, the linear motion position detection unit 50 is disposed between the magnet 22 and the frame body 5*a* of the frame 5, and the rotational position detection unit 60 is disposed between the frame body 5*a* of the frame 5 and the portion of the shaft 21, on which portion where the magnet 22 is not located. Except for this point, the eleventh embodiment is the same as the tenth embodiment, and redundant description will be omitted.

The rotation scale 61 of the rotational position detection unit 60 is disposed on an outer periphery of the portion of the shaft 21 where the magnet 22 is not located, and the rotation detector 62 is disposed on the inner peripheral wall of the frame body 5*a* in such a way as to face the rotation scale 61. The linear motion scale 51 and the rotation scale 61 are provided in such a way as to cover the entire range of motion in the linear motion direction and the entire range of rotation in the circumferential direction.

According to the eleventh embodiment, the linear motion scale 51 and the rotation scale 61 can be disposed on the shaft 21 even when the magnet 22 of the mover 20 is small in length in the linear motion direction. Therefore, in addition to the effects of the tenth embodiment, the eleventh embodiment achieves the effect of reducing the cost of the position detector due to parts used in common.

Twelfth Embodiment

Figure 16:
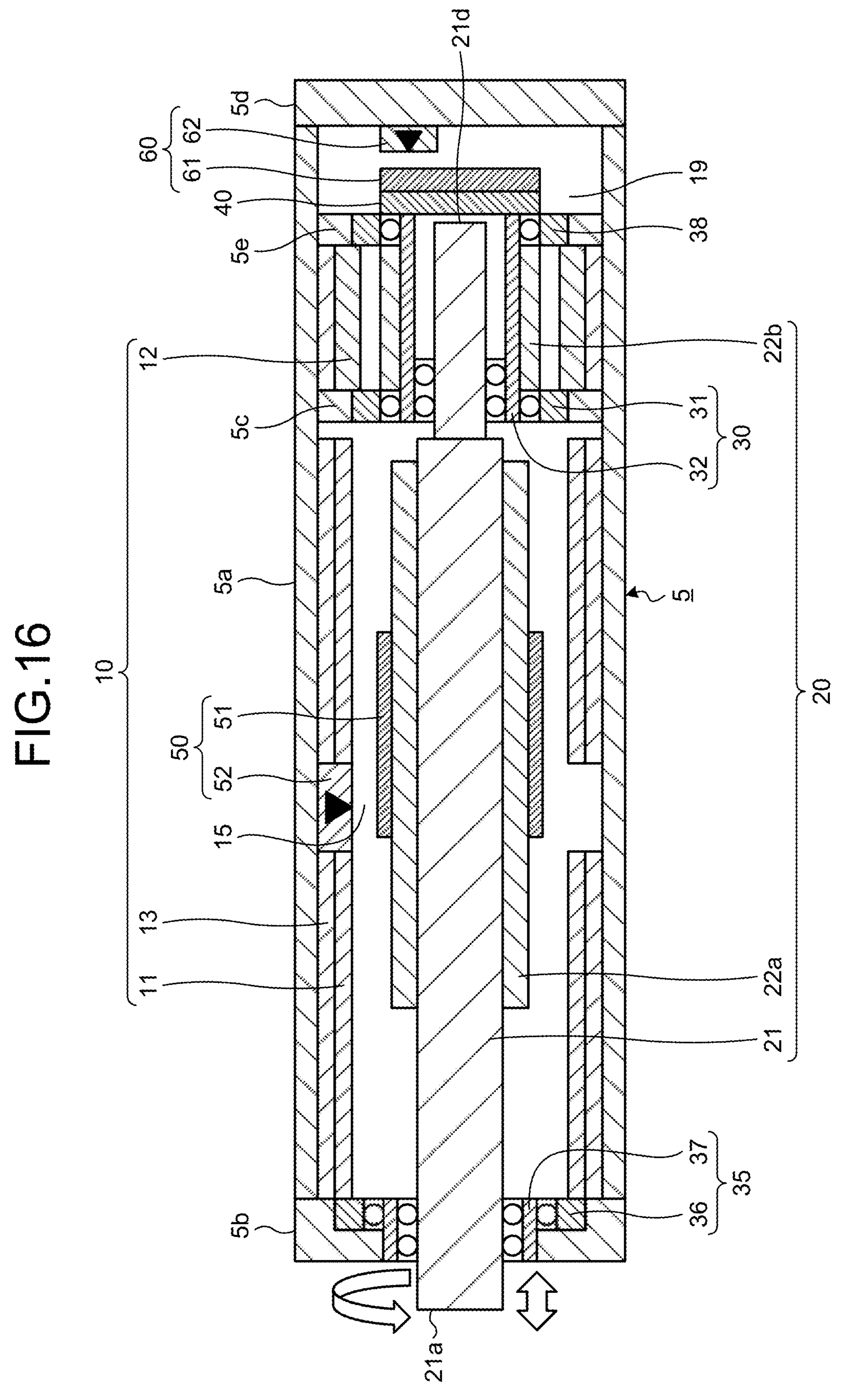
FIG. 16 is a sectional side view of a linear rotary motor according to a twelfth embodiment.

FIG. 16 is a sectional side view of a linear rotary motor according to a twelfth embodiment. In the twelfth embodiment, the linear motion coil 11 and the rotation coil 12 are separated from each other in the linear motion direction with the intermediate plate 5*c* interposed therebetween. Furthermore, the magnet of the mover 20 is separated into a linear motion magnet 22*a* and a rotation magnet 22*b* in the linear motion direction. The rotation magnet 22*b* is disposed in a space surrounded by the intermediate plate 5*c* and an intermediate plate 5*e*.

The linear motion detector 52 is disposed in the linear motion coil 11 and fixed to the inner peripheral wall of the frame body 5*a*. The linear motion scale 51 is disposed on the outer periphery of the magnet 22 of the mover 20 in the gap 15.

The frame 5 includes the frame body 5*a*, the first end plate 5*b*, the intermediate plate 5*c*, the intermediate plate 5*e*, and the second end plate 5*d*. A bearing 38 is provided on the intermediate plate 5*e*. The bearing 38 is connected to the outer periphery of the ball spline 32. The linear motion rotation bearing 30 including the bearing 31 and the ball spline 32 is provided on the intermediate plate 5*c*. The linear motion rotation bearing 30 supports a base end portion 21*d* of the shaft 21.

The rotation magnet 22*b* is disposed on the outer periphery of the ball spline 32. Since movement in the linear motion direction is prevented by the ball spline 32, the rotation magnet 22*b* constantly faces the rotation coil 12. The rotation scale 61 is fixed to the rotation scale attaching portion 40 disposed on the outer periphery of the ball spline 32, and rotates together with the ball spline 32. The rotation detector 62 is fixed to the second end plate 5*d* of the frame 5 at a constant distance from the rotation scale 61.

According to the twelfth embodiment, the magnet 22 for the linear rotary motor becomes unnecessary, and the linear motion magnet 22*a* for a general linear motor (shaft linear motor) and the rotation magnet 22*b* for the rotary motor can be used. Therefore, cost can be reduced due to parts used in common. In addition, since the ball spline 32 is disposed on the inner side of the rotation magnet 22*b*, it is possible to prevent movement in the linear motion direction in the rotary motor. As a result, the overall length of the motor can be reduced.

Thirteenth Embodiment

Figure 17:
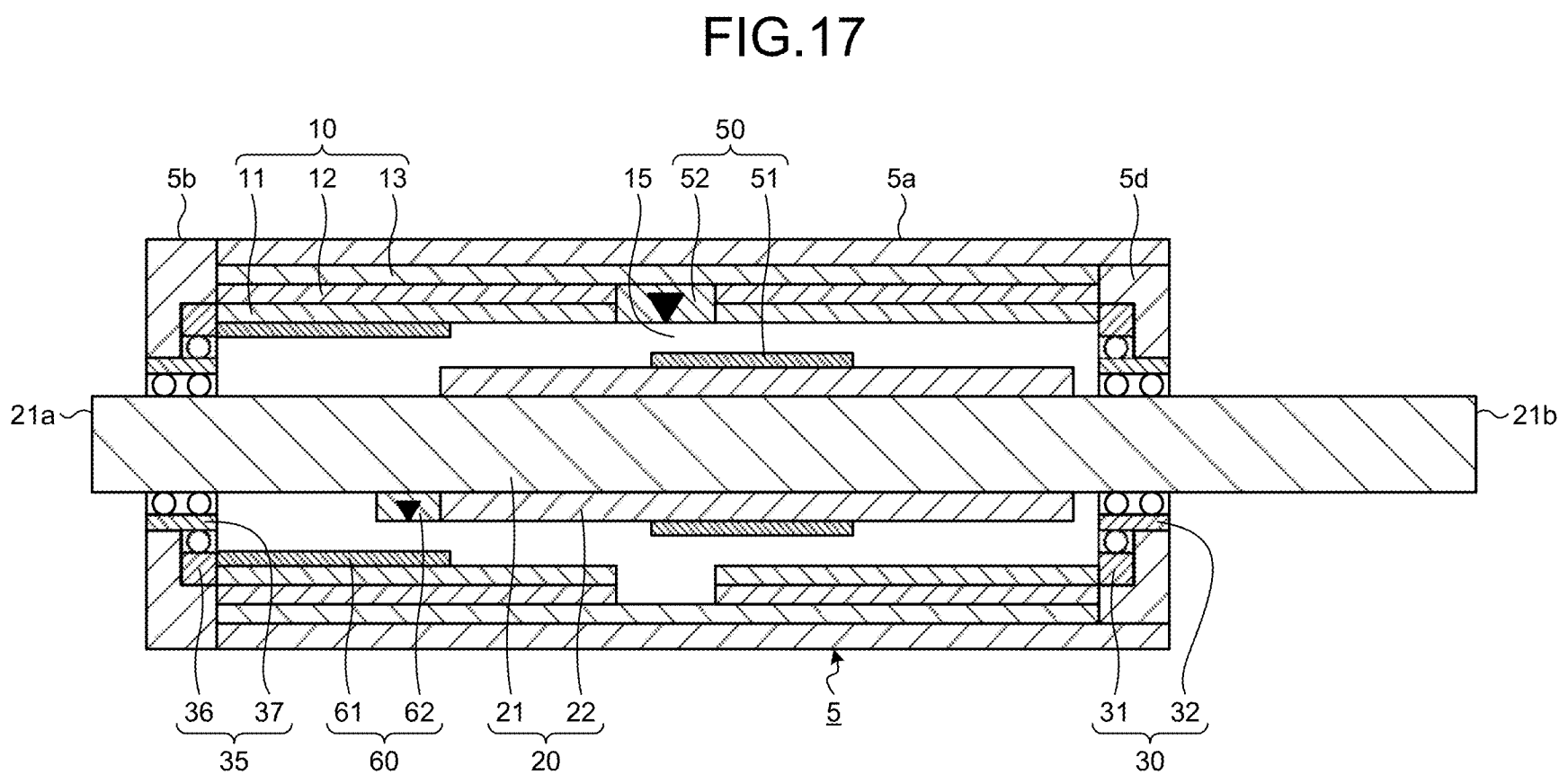

FIG. 17 is a sectional side view of a linear rotary motor according to a thirteenth embodiment. In the thirteenth embodiment, the stator 10 includes the linear motion coil 11, the rotation coil 12, and the stator core 13, which are coaxially arranged on the inner peripheral wall of the frame body 5*a* of the frame 5, as in the first embodiment. The linear motion detector 52 is disposed in the linear motion coil 11 and the rotation coil 12, and the linear motion scale 51 is disposed on the outer periphery with the magnet 22. The linear motion scale 51 is provided in such a way as to cover the entire range of motion in the linear motion direction and the entire range of rotation in the circumferential direction.

Meanwhile, the rotation detector 62 is provided on the outer periphery of the shaft 21 or the magnet 22 of the mover 20. In FIG. 17, the rotation detector 62 is provided on the outer periphery of the shaft 21. Therefore, the rotation detector 62 moves in the linear motion direction and the rotation direction. The rotation scale 61 is disposed on an inner periphery of the linear motion coil 11, which is a radially inner coil, in such a way as to face the rotation detector 62. The rotation scale 61 is provided over the range of motion in a linear motion direction and the range of rotation in the circumferential direction so as to face the rotation detector 62 when the rotation detector 62 moves rectilinearly or rotates. Power supply and signal transmission to the rotation detector 62 may be performed wirelessly, or may be performed by use of a slip ring. Alternatively, the range of rotation may be limited such that power supply and signal transmission to the rotation detector 62 is performed through wire communication. Note that the arrangement of the linear motion position detection unit 50 and the rotational position detection unit 60 may be reversed.

According to the thirteenth embodiment, since the motor unit and the position detection unit are integrated, the overall length of the motor can be reduced. In addition, the present embodiment allows the linear motion position detection unit 50 and the rotational position detection unit 60 to have the same configuration. Therefore, the cost of the position detector can be reduced due to parts used in common.

Fourteenth Embodiment

Figure 18:
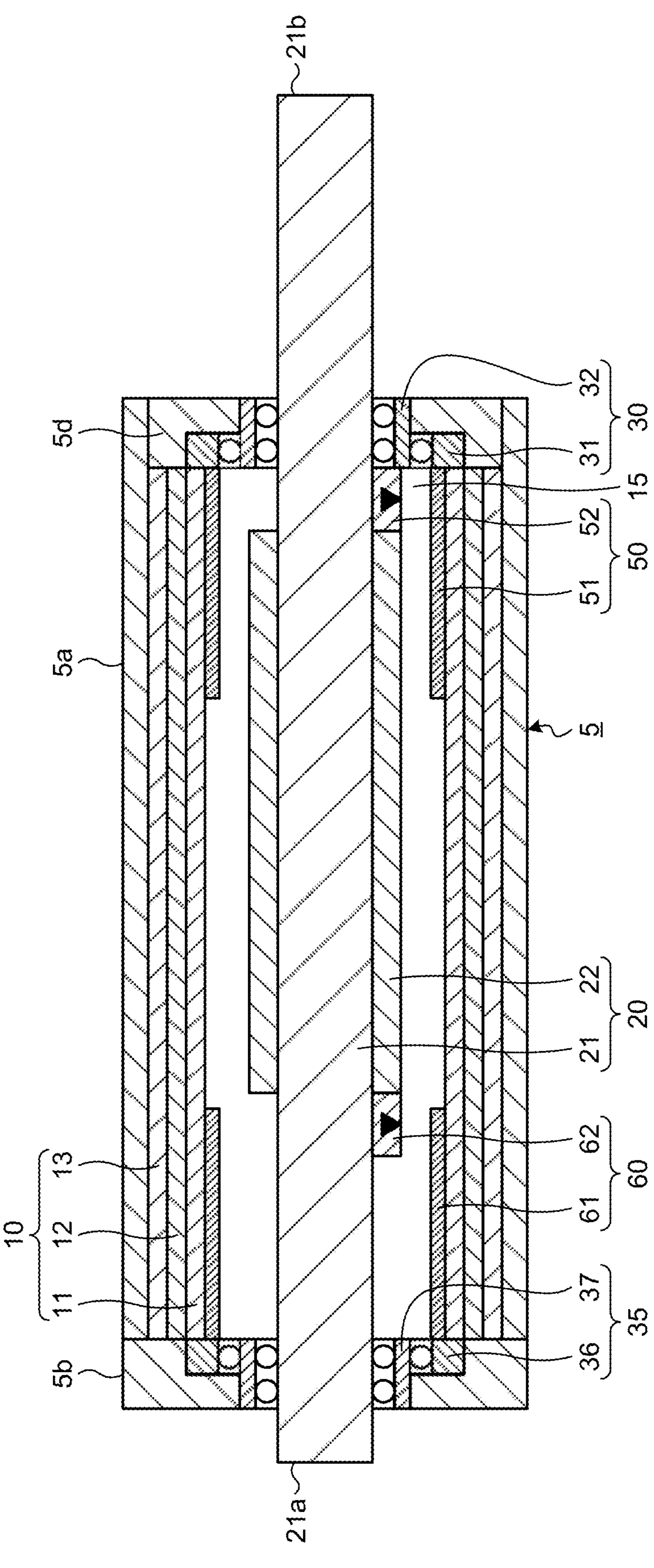
FIG. 18 is a sectional side view of a linear rotary motor according to a fourteenth embodiment.

FIG. 18 is a sectional side view of a linear rotary motor according to a fourteenth embodiment. The position where the linear motion position detection unit 50 is located in the thirteenth embodiment has been changed in the fourteenth embodiment. Except for this point, the fourteenth embodiment is the same as the thirteenth embodiment, and redundant description will be omitted.

In the fourteenth embodiment, the linear motion detector 52 and the rotation detector 62 are provided on the outer periphery of the shaft 21 or the magnet 22 of the mover 20. In FIG. 18, the linear motion detector 52 and the rotation detector 62 are provided on the outer periphery of the shaft 21. The linear motion scale 51 is disposed on the inner periphery of the linear motion coil 11, which is a coil on the inner side, in such a way as to face the linear motion detector 52. The rotation scale 61 is disposed on the inner periphery of the linear motion coil 11, which is a coil on the inner side, in such a way as to face the rotation detector 62. The linear motion scale 51 and the rotation scale 61 are provided over the range of motion in the linear motion direction and the range of rotation in the circumferential direction so as to face the linear motion detector 52 and the rotation detector 62, respectively, when the linear motion detector 52 and the rotation detector 62 move rectilinearly or rotate.

According to the fourteenth embodiment, since the motor unit and the position detection unit are integrated, the overall length of the motor can be reduced. In addition, the present embodiment allows the linear motion position detection unit 50 and the rotational position detection unit 60 to have the same configuration. Therefore, the cost of the position detector can be reduced due to parts used in common. Furthermore, it is possible to reduce motor loss as a result of increasing the volumes of the linear motion coil 11 and the rotation coil 12.

Fifteenth Embodiment

Figure 19:
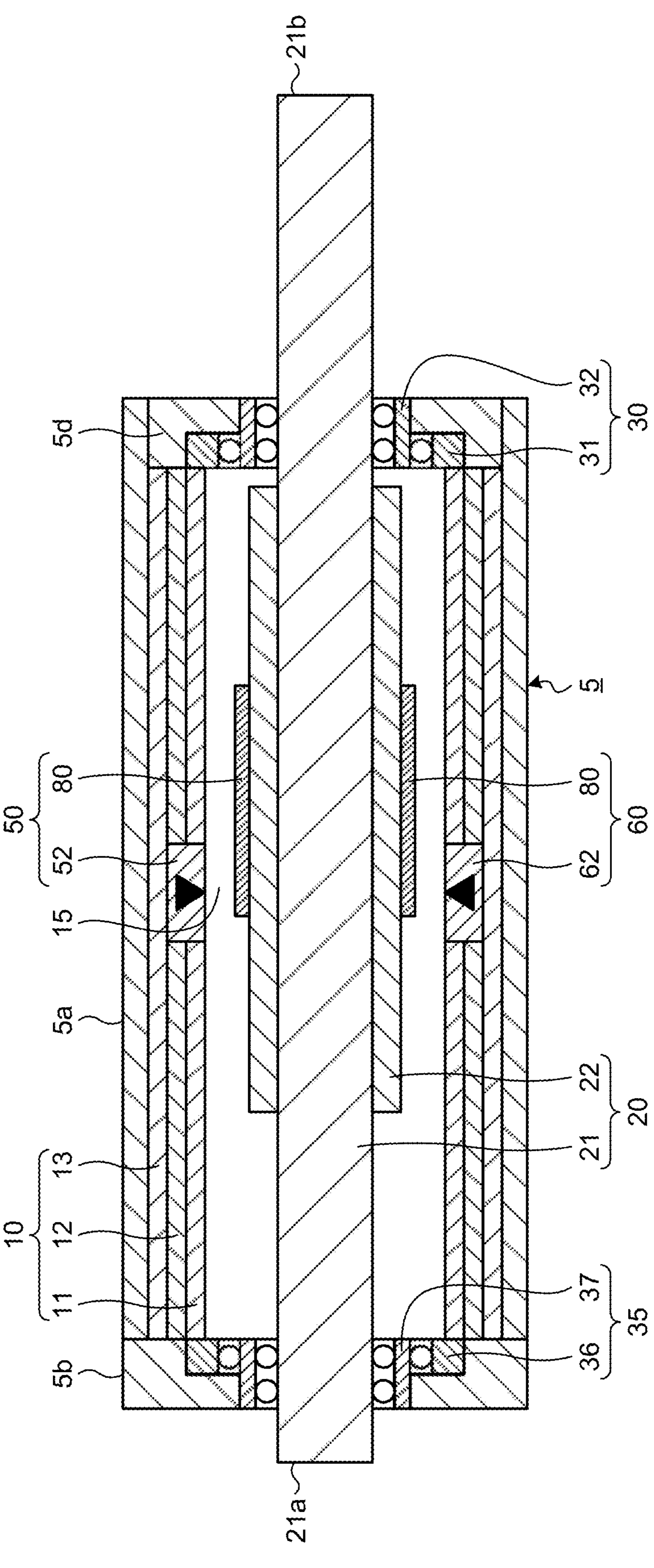
FIG. 19 is a sectional side view of a linear rotary motor according to a fifteenth embodiment.

FIG. 19 is a sectional side view of a linear rotary motor according to a fifteenth embodiment. A linear motion rotation scale 80 has been adopted in the fifteenth embodiment. The linear motion rotation scale 80 has functions of a linear motion scale and a rotation scale. The linear motion rotation scale 80 is a component that functions as both a linear motion scale and a rotation scale. Furthermore, the linear motion detector 52 and the rotation detector 62 are disposed on the inner peripheral wall of the frame body 5*a* in such a way as to face the linear motion rotation scale 80. The linear motion detector 52 and the rotation detector 62 are symmetrically arranged with respect to the mover 20 such that the positions of the linear motion detector 52 and the rotation detector 62 are identical with respect to the linear motion direction.

As in the first embodiment, the stator 10 includes the linear motion coil 11, the rotation coil 12, and the stator core 13, which are coaxially arranged on the inner peripheral wall of the frame body 5*a* of the frame 5. The linear motion detector 52 is disposed in the linear motion coil 11 and the rotation coil 12, and is fixed to the stator core 13. The rotation detector 62 is disposed in the linear motion coil 11 and the rotation coil 12 at a position different from the position of the linear motion detector 52 in the circumferential direction, and is fixed to the stator core 13. The rotation detector 62 may be disposed in such a way as to face the linear motion detector 52 with the mover 20 interposed therebetween. Note that the linear motion detector 52 and the rotation detector 62 may be integrated and disposed at different positions on a single board.

The linear motion rotation scale 80 is disposed on the outer periphery of the mover 20 in the gap 15. Specifically, the linear motion rotation scale 80 is disposed on the outer periphery of the magnet 22. The linear motion rotation scale 80 is provided over the range of motion in the linear motion direction and the range of rotation in the circumferential direction so as to face the linear motion detector 52 and the rotation detector 62 when the mover 20 moves rectilinearly or rotates.

The linear motion rotation scale 80 is an optical scale in which graduations have been formed on an entire sheet-like member in two directions orthogonal to each other. The linear motion rotation scale 80 is fixed to the surface of the magnet 22 with adhesive. Note that graduations may be directly formed on a cylindrical metal member which is disposed on the outer periphery of the magnet 22. Alternatively, a magnet may be embedded in the metal member on which graduations have been formed so that the metal member may have both the function of a scale and the function of holding the magnet.

Figure 20:
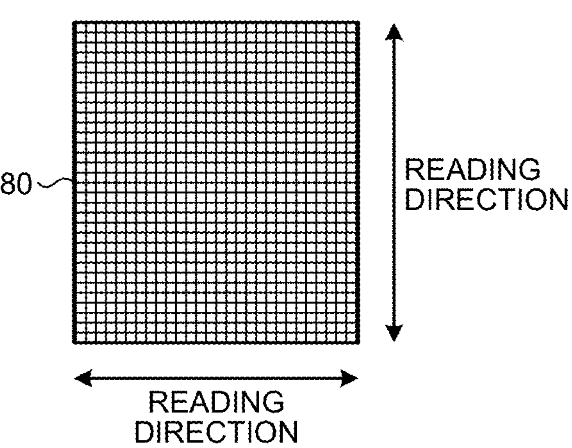
FIG. 20 is a developed view of an example of a linear motion rotation scale included in the linear rotary motor according to the fifteenth embodiment.

FIG. 20 is a developed view of an example of the linear motion rotation scale 80 included in the linear rotary motor according to the fifteenth embodiment. Graduations have been formed on the entire linear motion rotation scale 80 in FIG. 20 in two directions orthogonal to each other. As a result, it is possible to detect displacement in both the linear motion direction and the rotation direction over the entire scale by using the linear motion detector 52 and the rotation detector 62.

Figure 21:
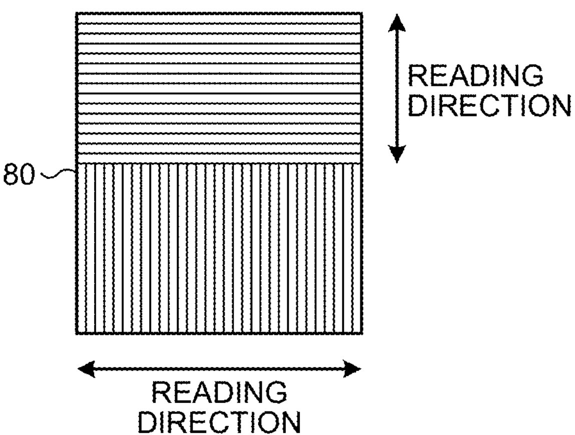
FIG. 21 is a developed view of another example of the linear motion rotation scale included in the linear rotary motor according to the fifteenth embodiment.

FIG. 21 is a developed view of another example of the linear motion rotation scale 80 included in the linear rotary motor according to the fifteenth embodiment. The linear motion rotation scale 80 in FIG. 21 is formed by a combination of two scales with graduations formed thereon in a single direction. Graduations have been formed on one of the scales in one direction, and graduations have been formed on the other scale in a direction orthogonal to the one direction. The range of motion of the motor in the circumferential direction is 180 degrees or less. However, since it is possible to use a scale on which graduations have been formed in a single direction, the cost of the scale can be reduced.

In the fifteenth embodiment, the linear motion rotation scale 80 is used which is a component that functions as both a linear motion scale and a rotation scale. Thus, in addition to the effects of the embodiments described above, the fifteenth embodiment achieves the effects of downsizing the scale and enabling the scale for detecting positions in the linear motion direction and the rotation direction to be disposed on the mover 20 even when the mover 20 is small in length in the linear motion direction. Note that, as illustrated in FIG. 6, the linear motion detector 52 and the rotation detector 62 may be disposed on the surface of one of the linear motion coil 11 and the rotation coil 12, the one being disposed on the inner side.

The configurations set forth in the above embodiments show examples of the subject matter of the present disclosure, and it is possible to combine the configurations with another known technique, and is also possible to partially omit or change the configurations without departing from the scope of the present disclosure.

REFERENCE SIGNS LIST

5 frame; 5*a* frame body; 5*b* first end plate; 5*c*, 5*e* intermediate plate; 5*cl* hole; 5*d* second end plate; 10 stator; 11 linear motion coil; 12 rotation coil; 13 stator core; 15 gap; 16, 19 space; 17 recess; 20 mover; 21 shaft; 21*a* output shaft; 21*b* shaft portion; 21*c* through-hole; 21*d* base end portion; 22 magnet; 22*a* linear motion magnet; 22*b* rotation magnet; 30, 35 linear motion rotation bearing; 31, 36, 38 bearing; 32, 37 ball spline; 40, 40*a* rotation scale attaching portion; 50 linear motion position detection unit; 51 linear motion scale; 51*a* joint portion; 52 linear motion detector; 60 rotational position detection unit; 61, 61*a* rotation scale; 62 rotation detector; 80 linear motion rotation scale.

The invention claimed is:

1. A linear rotary motor including:

a frame including a cylindrical frame body;

a stator including a linear motion coil and a rotation coil, the linear motion coil being disposed on an inner peripheral wall of the frame body, the linear motion coil generating a linearly moving magnetic field in a linear motion direction, the linear motion coil and the rotation coil being coaxially arranged, the rotation coil generating a rotating magnetic field in a rotation direction; and a mover including a shaft and a magnet, the shaft being supported by the frame in such a way as to be rectilinearly movable and rotatable, the shaft including an output shaft, the magnet being provided on an outer periphery of the shaft, the linear motion coil and the rotation coil being energized to cause the mover to move rectilinearly and rotate, the linear rotary motor comprising:

a linear motion detector to detect a position of the mover in the linear motion direction, the linear motion detector being disposed on the frame or the stator in such a way as to face the magnet; and a linear motion scale provided on an outer periphery of the mover, the linear motion scale being provided over a range of motion in the linear motion direction and a range of rotation in a circumferential direction so as to face the linear motion detector when the mover moves rectilinearly or rotates, wherein the linear motion coil is separated into linear motion coils in the linear motion direction, and the rotation coil is separated into rotation coils in the linear motion direction, and the linear motion detector is disposed between the linear motion coils and between the rotation coils.

2. A linear rotary motor including:

a frame including a cylindrical frame body;

a stator including a linear motion coil and a rotation coil, the linear motion coil being disposed on an inner peripheral wall of the frame body, the linear motion coil generating a linearly moving magnetic field in a linear motion direction, the linear motion coil and the rotation coil being coaxially arranged, the rotation coil generating a rotating magnetic field in a rotation direction; and a mover including a shaft and a magnet, the shaft being supported by the frame in such a way as to be rectilinearly movable and rotatable, the shaft including an output shaft, the magnet being provided on an outer periphery of the shaft, the linear motion coil and the rotation coil being energized to cause the mover to move rectilinearly and rotate, the linear rotary motor comprising:

a linear motion detector to detect a position of the mover in the linear motion direction, the linear motion detector being disposed on the frame or the stator in such a way as to face the magnet; and a linear motion scale provided on an outer periphery of the mover, the linear motion scale being provided over a range of motion in the linear motion direction and a range of rotation in a circumferential direction so as to face the linear motion detector when the mover moves rectilinearly or rotates, wherein the linear motion coil is separated into linear motion coils in the linear motion direction, and the rotation coil is separated into rotation coils in the linear motion direction, and the linear motion detector is disposed between the linear motion coils and between the rotation coils, the frame includes a first end plate, an intermediate plate, and a second end plate, the first end plate having a first linear motion rotation bearing provided thereon, the first linear motion rotation bearing supporting the output shaft such that the output shaft is rectilinearly movable and rotatable, the intermediate plate having a second linear motion rotation bearing provided thereon, the second linear motion rotation bearing supporting a shaft portion of the shaft such that the shaft portion is rectilinearly movable and rotatable, the shaft portion being on a side opposite to the output shaft, a hollow rotation scale attaching portion is fixed to the second linear motion rotation bearing, and a rotation scale is fixed to the rotation scale attaching portion, and a rotation detector is fixed to the second end plate, the rotation detector detecting a position of the mover in the rotation direction by reading the rotation scale.

3. The linear rotary motor according to claim 2, wherein the linear motion detector is fixed to the inner peripheral wall of the frame body, and the linear motion scale is disposed on an outer periphery of the magnet.

4. The linear rotary motor according to claim 2, wherein the linear motion detector is disposed on a surface of one of the linear motion coil and the rotation coil, the one of the linear motion coil and the rotation coil being disposed radially inside the other, and the linear motion scale is disposed on an outer periphery of the magnet.

5. The linear rotary motor according to claim 2, wherein the rotation scale is hollow, and the shaft has, on the side opposite to the output shaft, an end exposed outside the second end plate.

6. The linear rotary motor according to claim 1, comprising:

a rotation detector to detect a position of the mover in the rotation direction, the rotation detector being disposed on the frame or the stator in such a way as to face the magnet; and a rotation scale provided on the outer periphery of the mover, the rotation scale being provided over the range of motion in the linear motion direction and the range of rotation in the circumferential direction so as to face the rotation detector when the mover moves rectilinearly or rotates.

7. The linear rotary motor according to claim 6, wherein the linear motion detector and the rotation detector are fixed to the inner peripheral wall of the frame body, and are disposed in at least one of the linear motion coil and the rotation coil extending in the linear motion direction, and the linear motion scale and the rotation scale are disposed on an outer periphery of the magnet.

8. A linear rotary motor including:

a frame including a cylindrical frame body;

a stator including a linear motion coil and a rotation coil, the linear motion coil being disposed on an inner peripheral wall of the frame body, the linear motion coil generating a linearly moving magnetic field in a linear motion direction, the linear motion coil and the rotation coil being coaxially arranged, the rotation coil generating a rotating magnetic field in a rotation direction; and a mover including a shaft and a magnet, the shaft being supported by the frame in such a way as to be rectilinearly movable and rotatable, the shaft including an output shaft, the magnet being provided on an outer periphery of the shaft, the linear motion coil and the rotation coil being energized to cause the mover to move rectilinearly and rotate, the linear rotary motor comprising:

a linear motion detector to detect a position of the mover in the linear motion direction, the linear motion detector being disposed on the frame or the stator in such a way as to face the magnet; and a linear motion scale provided on an outer periphery of the mover, the linear motion scale being provided over a range of motion in the linear motion direction and a range of rotation in a circumferential direction so as to face the linear motion detector when the mover moves rectilinearly or rotates, wherein the linear motion coil is separated into linear motion coils in the linear motion direction, and the rotation coil is separated into rotation coils in the linear motion direction, and the linear motion detector is disposed between the linear motion coils and between the rotation coils, a rotation scale is disposed on a surface of one of the linear motion coil and the rotation coil, the one of the linear motion coil and the rotation coil being disposed radially inside the other, and a rotation detector is fixed to the mover, the rotation detector detecting a position of the mover in the rotation direction by reading the rotation scale.

9. The linear rotary motor according to claim 1, comprising:

a rotation detector to detect a position of the mover in the rotation direction, the rotation detector being disposed on the frame or the stator in such a way as to face the magnet, the rotation detector and the linear motion detector being disposed at different positions in the circumferential direction, wherein the linear motion scale is a linear motion rotation scale having graduations formed in two directions orthogonal to each other the linear motion detector and the rotation detector are disposed on the inner peripheral wall of the frame body in such a way as to face the linear motion rotation scale, the linear motion detector and the rotation detector being arranged about the mover, the linear motion detector and the rotation detector being located in the same positions in the linear motion direction.

* * * * *